(12) United States Patent
Pezeshki et al.

(10) Patent No.: US 11,963,023 B2
(45) Date of Patent: Apr. 16, 2024

(54) EARLY NEGATIVE ACKNOWLEDGMENT INDICATION FOR A DATA MESSAGE

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Jingchao Bao, San Diego, CA (US); Taesang Yoo, San Diego, CA (US); Junyi Li, Fairless Hills, PA (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/400,110

(22) Filed: Aug. 11, 2021

(65) Prior Publication Data

US 2022/0053347 A1 Feb. 17, 2022

Related U.S. Application Data

(60) Provisional application No. 63/066,151, filed on Aug. 14, 2020, provisional application No. 63/064,834, filed on Aug. 12, 2020.

(51) Int. Cl.
*H04W 24/04* (2009.01)
*H04B 7/06* (2006.01)
(Continued)

(52) U.S. Cl.
CPC .......... *H04W 24/04* (2013.01); *H04B 7/0695* (2013.01); *H04L 1/1657* (2013.01); *H04L 5/0055* (2013.01); *H04W 72/0446* (2013.01)

(58) Field of Classification Search
CPC . H04W 24/04; H04W 72/0446; H04W 24/08; H04W 74/0833; H04L 1/1657;
(Continued)

(56) References Cited

U.S. PATENT DOCUMENTS

| 2013/0051272 | A1* | 2/2013 | Wiberg | H04L 1/189 |
| | | | | 370/252 |
| 2022/0225260 | A1* | 7/2022 | Yi | H04W 74/0833 |
| 2022/0232600 | A1* | 7/2022 | Kim | H04L 1/08 |

FOREIGN PATENT DOCUMENTS

| GB | 2576210 A | * | 2/2020 | .............. H04L 1/08 |
| JP | 2019-537291 A | * | 12/2019 | |

* cited by examiner

*Primary Examiner* — Vinncelas Louis
(74) *Attorney, Agent, or Firm* — Holland & Hart LLP/Qualcomm Incorporated

(57) ABSTRACT

Methods, systems, and devices for wireless communications are described. Some systems may support the transmission of a predicted negative acknowledgment (NACK) indication for a downlink data message. In some cases, a base station may transmit a downlink data message to a user equipment (UE). The UE may perform a decoding process for the message. The UE may determine whether the decoding process is likely to fail during a first portion of the decoding process prior to completion of the decoding process. The UE may transmit a predicted NACK message to the base station prior to a feedback opportunity configured for the UE to transmit feedback based on a result of the completed decoding process. The base station may determine whether to retransmit the downlink data message based on the predicted NACK message, such that the predicted NACK message may reduce the latency associated with retransmission of downlink data messages.

26 Claims, 19 Drawing Sheets

(51) Int. Cl.
*H04L 1/1607* (2023.01)
*H04L 5/00* (2006.01)
*H04W 72/0446* (2023.01)

(58) Field of Classification Search
CPC ....... H04L 5/0055; H04L 1/08; H04L 1/1854; H04L 1/1861; H04L 1/1864; H04L 1/1896; H04L 5/0007; H04L 5/001; H04L 1/189; H04B 7/0695
See application file for complete search history.

EARLY NEGATIVE ACKNOWLEDGMENT INDICATION FOR A DATA MESSAGE

CROSS REFERENCES

The present application for patent claims the benefit of U.S. Provisional Patent Application No. 63/064,834 by Pezeshki et al., entitled "EARLY NEGATIVE ACKNOWLEDGMENT INDICATION FOR A DATA MESSAGE," filed Aug. 12, 2020, and the benefit of U.S. Provisional Patent Application No. 63/066,151 by Pezeshki et al., entitled "EARLY NEGATIVE ACKNOWLEDGMENT INDICATION FOR MULTIPLE TRANSMISSION RECEPTION POINTS," filed Aug. 14, 2020, each of which is assigned to the assignee hereof, and each of which is expressly incorporated by reference herein.

FIELD OF TECHNOLOGY

The following relates to wireless communications, including early negative acknowledgment (NACK) indication for a data message.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support early negative acknowledgment (NACK) indication for a data message. Generally, the described techniques provide for a user equipment (UE) to predict that a decoding process will fail and transmit a predicted NACK message to a base station according to a shorter timeline than a hybrid automatic repeat request (HARQ) transmission timeline (e.g., based on a completed decoding process) to reduce latency. For example, the base station may transmit a downlink data message to the UE, and the UE may perform a decoding process for the downlink data message. In some examples, the base station (or a set of base stations) may include two or more transmission reception points (TRPs), and the UE may receive the downlink data message from a first TRP of the base station. There may be a feedback opportunity configured for the UE to transmit a feedback message (e.g., a HARQ message) including a positive acknowledgment (ACK) or a NACK to the base station based on a result of the decoding process. If the base station includes two or more TRPs, the UE may transmit the feedback message to a second TRP of the base station. Additionally or alternatively, a UE may determine that the decoding process is likely to fail based on one or more of the early decoding stages, and the UE may transmit a predicted NACK message to the base station or a TRP of the base station accordingly. For example, the UE may determine that the decoding process is likely to fail based on one or more decoding metrics obtained during the initial stages of decoding the downlink data message, a channel quality measurement associated with receiving the downlink data message, a machine learning algorithm at the UE, or some combination thereof, and the UE may determine to transmit a predicted NACK message accordingly.

The UE may transmit the predicted NACK message before the UE finishes decoding the downlink data message. For example, the predicted NACK message may be transmitted before the feedback occasion in which the feedback message indicating the ACK or NACK may be transmitted. The base station may determine whether to retransmit the downlink data message based on the predicted NACK message. For example, the base station may determine to retransmit the downlink data message based on a threshold associated with the predicted NACK message. As such, if the base station receives a predicted NACK message, the base station may retransmit the downlink data message earlier (e.g., with less latency) based on the predicted NACK message than if the base station retransmits the downlink data message based on a HARQ message in the scheduled HARQ feedback opportunity, thereby improving the efficiency and shortening the processing timeline associated with the communications.

A method for wireless communications at a UE is described. The method may include receiving a downlink data message from a base station, performing a decoding process for the downlink data message, and transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process.

An apparatus for wireless communications is described. The apparatus may include a processor of a UE, a transceiver coupled with the processor, and memory coupled with the processor. The memory and the processor may be configured to cause the apparatus to receive a downlink data message from a base station, perform a decoding process for the downlink data message, and transmit, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process.

Another apparatus for wireless communications at a UE is described. The apparatus may include means for receiving a downlink data message from a base station, means for performing a decoding process for the downlink data message, and means for transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process.

A non-transitory computer-readable medium storing code for wireless communications at a UE is described. The code may include instructions executable by a processor to receive a downlink data message from a base station, perform a decoding process for the downlink data message, and transmit, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process.

In some examples of the method, apparatuses, and non-transitory computer-readable medium described herein, receiving the downlink data message may include operations, features, means, or instructions for receiving the downlink data message from a first TRP of the base station, and transmitting the predicted NACK message may include operations, features, means, or instructions for transmitting the predicted NACK message to a second TRP of the base station.

In some examples of the method, apparatuses, and non-transitory computer-readable medium described herein, the downlink data message may be received from the first TRP according to a first beam configuration and the predicted NACK message may be transmitted to the second TRP according to a second beam configuration.

Some examples of the method, apparatuses, and non-transitory computer-readable medium described herein may further include operations, features, means, or instructions for receiving, from the base station, a retransmission of the downlink data message based on the predicted NACK message.

Some examples of the method, apparatuses, and non-transitory computer-readable medium described herein may further include operations, features, means, or instructions for determining a prediction metric for decoding the downlink data message, where the prediction metric indicates an estimated likelihood of the decoding process failing for the downlink data message, determining that the prediction metric fails to satisfy a retransmission threshold for retransmission at the base station, and refraining from monitoring for a retransmission of the downlink data message in response to the predicted NACK message based on the prediction metric failing to satisfy the retransmission threshold for retransmission at the base station.

Some examples of the method, apparatuses, and non-transitory computer-readable medium described herein may further include operations, features, means, or instructions for transmitting, to the base station, a UE capability message indicating support for transmitting the predicted NACK message, a processing timeline value for the UE to transmit the predicted NACK message, or a combination thereof, where the predicted NACK message may be transmitted based on the UE capability message.

Some examples of the method, apparatuses, and non-transitory computer-readable medium described herein may further include operations, features, means, or instructions for receiving, from the base station, a configuration message indicating a timing for transmitting the predicted NACK message, one or more retransmission thresholds for retransmission at one or more TRPs of the base station based on a prediction metric of the predicted NACK message, or a combination thereof, where the predicted NACK message may be transmitted based on the configuration message.

Some examples of the method, apparatuses, and non-transitory computer-readable medium described herein may further include operations, features, means, or instructions for generating the predicted NACK message, where the generating may be initiated prior to completion of the decoding process for the downlink data message and the predicted NACK message includes an indication of a cause for the decoding process for the downlink data message to be predicted to fail, a prediction metric indicating an estimated likelihood of the decoding process failing for the downlink data message, or a combination thereof, and where the predicted NACK message may be transmitted based on the generating.

In some examples of the method, apparatuses, and non-transitory computer-readable medium described herein, the completion of the decoding process includes the decoding process succeeding for the downlink data message, the decoding process failing for the downlink data message, an early termination of the decoding process for the downlink data message, or a combination thereof.

Some examples of the method, apparatuses, and non-transitory computer-readable medium described herein may further include operations, features, means, or instructions for determining that the decoding process for the downlink data message is predicted to fail based on one or more signal-to-noise ratio (SNR) values, one or more signal-to-interference-plus-noise ratio (SINR) values, one or more reference signal received power (RSRP) values, one or more reference signal received quality (RSRQ) values, or a combination thereof for one or more demodulation reference signals (DMRSs) received with the downlink data message, one or more log-likelihood ratios (LLRs) for a first set of decoding stages of a set of multiple decoding stages for the decoding process, one or more path metrics for the first set of decoding stages of the set of multiple decoding stages for the decoding process, or a combination thereof, where the predicted NACK message may be transmitted based on the decoding process for the downlink data message being predicted to fail.

Some examples of the method, apparatuses, and non-transitory computer-readable medium described herein may further include operations, features, means, or instructions for providing a set of decoding parameters of the decoding process for the downlink data message to a machine learning algorithm, where the decoding process for the downlink data message may be predicted to fail based on an output of the machine learning algorithm, the output of the machine learning algorithm indicating that the decoding process for the downlink data message may be predicted to fail, a probability that the decoding process for the downlink data message will fail, or a combination thereof.

Some examples of the method, apparatuses, and non-transitory computer-readable medium described herein may further include operations, features, means, or instructions for labeling a set of decoding processes for a set of downlink data messages according to whether each decoding process of the set of decoding processes fails and training the machine learning algorithm using the labeled set of decoding processes and the set of decoding parameters of the labeled set of decoding processes.

Some examples of the method, apparatuses, and non-transitory computer-readable medium described herein may further include operations, features, means, or instructions for completing the decoding process for the downlink data message and transmitting, to the base station and in the feedback opportunity, a feedback message including an ACK or a NACK for the downlink data message based on the result of the decoding process.

Some examples of the method, apparatuses, and non-transitory computer-readable medium described herein may further include operations, features, means, or instructions for determining a first uplink resource for transmitting the predicted NACK message based on a first processing timeline value and a starting symbol for receiving the downlink data message and determining the feedback opportunity for transmitting the feedback message subsequent to the first uplink resource based on a second processing timeline value and an ending symbol for receiving the downlink data message.

Some examples of the method, apparatuses, and non-transitory computer-readable medium described herein may further include operations, features, means, or instructions for operating in a half-duplex mode, where the first uplink resource includes a dedicated uplink resource for transmitting the predicted NACK message time-division duplexed with a set of multiple downlink resources in a time period.

In some examples of the method, apparatuses, and non-transitory computer-readable medium described herein, the result of the decoding process includes a successful decoding result, and the feedback message includes the ACK for the downlink data message. Some such examples of the method, apparatuses, and non-transitory computer-readable medium described herein may further include operations, features, means, or instructions for updating a machine learning algorithm for determining to transmit the predicted NACK message based on transmitting the predicted NACK message and the result of the decoding process including the successful decoding result.

In some examples of the method, apparatuses, and non-transitory computer-readable medium described herein, the downlink data message may be received in a time period and the predicted NACK message may be transmitted in the time period prior to an end of the time period.

In some examples of the method, apparatuses, and non-transitory computer-readable medium described herein, the downlink data message may be received in a first time period of a set of multiple contiguous time periods allocated for downlink signaling and the predicted NACK message may be transmitted in a second time period of the set of multiple contiguous time periods prior to at least a portion of the set of multiple contiguous time periods.

A method for wireless communications at a base station is described. The method may include transmitting a downlink data message to a UE, receiving, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process, and transmitting, to the UE, a retransmission of the downlink data message based on the predicted NACK message.

An apparatus for wireless communications is described. The apparatus may include a processor of a base station, a transceiver coupled with the processor, and memory coupled with the processor. The memory and the processor may be configured to cause the apparatus to transmit a downlink data message to a UE, receive, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process, and transmit, to the UE, a retransmission of the downlink data message based on the predicted NACK message.

Another apparatus for wireless communications at a base station is described. The apparatus may include means for transmitting a downlink data message to a UE, means for receiving, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process, and means for transmitting, to the UE, a retransmission of the downlink data message based on the predicted NACK message.

A non-transitory computer-readable medium storing code for wireless communications at a base station is described. The code may include instructions executable by a processor to transmit a downlink data message to a UE, receive, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process, and transmit, to the UE, a retransmission of the downlink data message based on the predicted NACK message.

In some examples of the method, apparatuses, and non-transitory computer-readable medium described herein, transmitting the downlink data message may include operations, features, means, or instructions for transmitting the downlink data message via a first TRP of the base station, and receiving the predicted NACK message may include operations, features, means, or instructions for receiving the predicted NACK message via a second TRP of the base station.

In some examples of the method, apparatuses, and non-transitory computer-readable medium described herein, the downlink data message may be transmitted via the first TRP according to a first beam configuration and the predicted NACK message may be received via the second TRP according to a second beam configuration.

Some examples of the method, apparatuses, and non-transitory computer-readable medium described herein may further include operations, features, means, or instructions for determining that a prediction metric indicated by the predicted NACK message satisfies a retransmission threshold, where the prediction metric indicates an estimated likelihood of the decoding process for the downlink data message failing at the UE, and where transmitting the retransmission of the downlink data message may be further based on determining that the prediction metric satisfies the retransmission threshold.

Some examples of the method, apparatuses, and non-transitory computer-readable medium described herein may further include operations, features, means, or instructions for transmitting, to an additional UE, an additional downlink data message, receiving, from the additional UE and prior to an additional feedback opportunity for a result of an additional decoding process for the additional downlink data message at the additional UE, an additional predicted NACK message for the additional downlink data message, determining that an additional prediction metric indicated by the additional predicted NACK message fails to satisfy the retransmission threshold, and refraining from transmitting a retransmission of the additional downlink data message in response to the additional predicted NACK message based on the additional prediction metric failing to satisfy the retransmission threshold.

Some examples of the method, apparatuses, and non-transitory computer-readable medium described herein may further include operations, features, means, or instructions for receiving, from the UE, a UE capability message indicating support for transmitting the predicted NACK message, a processing timeline value for the UE to transmit the predicted NACK message, or a combination thereof and monitoring for the predicted NACK message based on the UE capability message, where the predicted NACK message may be received based on the monitoring.

Some examples of the method, apparatuses, and non-transitory computer-readable medium described herein may further include operations, features, means, or instructions for transmitting, to the UE, a configuration message indicating a timing for the UE to transmit the predicted NACK message, one or more retransmission thresholds for retransmission at one or more TRPs of the base station based on a prediction metric of the predicted NACK message, or a combination thereof, where the predicted NACK message may be received based on the configuration message.

In some examples of the method, apparatuses, and non-transitory computer-readable medium described herein, the predicted NACK message includes an indication of a cause for the decoding process for the downlink data message at the UE to be predicted to fail, a prediction metric indicating an estimated likelihood of the decoding process for the downlink data message to fail, or a combination thereof.

Some examples of the method, apparatuses, and non-transitory computer-readable medium described herein may further include operations, features, means, or instructions for receiving, from the UE and in the feedback opportunity, a feedback message including an ACK or a NACK for the downlink data message based on the result of the decoding process for the downlink data message at the UE and updating one or more decoding prediction statistics for the UE based on a comparison of the predicted NACK message and the feedback message, where the determining to transmit the retransmission of the downlink data message may be further based on the one or more decoding prediction statistics for the UE.

In some examples of the method, apparatuses, and non-transitory computer-readable medium described herein, the downlink data message may be transmitted in a time period, and the predicted NACK message may be received in the time period prior to an end of the time period.

In some examples of the method, apparatuses, and non-transitory computer-readable medium described herein, the downlink data message may be transmitted in a first time period of a set of multiple contiguous time periods allocated for downlink signaling, and the predicted NACK message may be received in a second time period of the set of multiple contiguous time periods prior to at least a portion of the set of multiple contiguous time periods.

DETAILED DESCRIPTION

Figure 1:
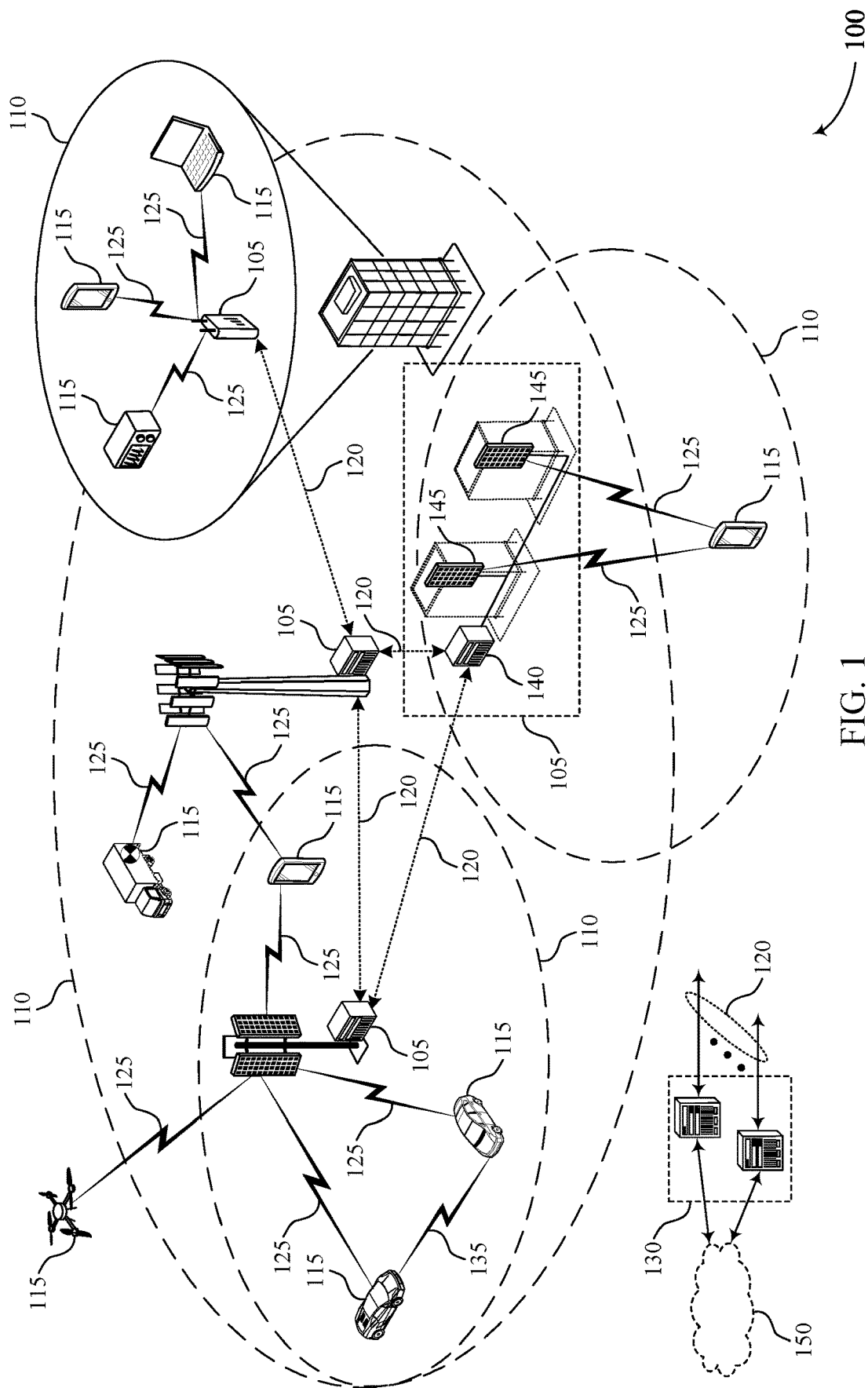
FIGS. 1 through 3 illustrate examples of wireless communications systems that support early negative acknowledgment (NACK) indication for a data message in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may communicate according to a pre-configured timeline for communications. For example, the base station may transmit a downlink data message to a UE, and the UE may receive and decode the downlink data message from the base station during a first time period. The UE may transmit a feedback message, such as a hybrid automatic repeat request (HARQ) message, including a positive acknowledgment (ACK) indication or a negative acknowledgment (NACK) indication to the base station in response to the downlink data message at a second time (e.g., during a feedback opportunity configured by the base station or another network entity). If the base station receives a NACK, the base station may determine to retransmit the downlink data message during a configured retransmission occasion. However, following such a timeline for communications between the base station and the UE may result in significant communication latency based on the processing timelines involved.

To support efficient retransmissions of the downlink data message and to reduce latency associated with the communications, the UE may determine to transmit a predicted NACK message to the base station before the UE finishes decoding the downlink data message. For example, a UE may perform a decoding process (e.g., a sequential decoding process) on a downlink data message as the downlink data message is received at the UE. In some cases, the UE may determine that the decoding process is likely to fail based on one or more of the early decoding stages, and the UE may transmit a predicted NACK message to the base station based on this determination. The UE may transmit the predicted NACK message before the UE finishes decoding the downlink data message or otherwise prior to a feedback occasion (e.g., a HARQ feedback occasion) in which the UE is scheduled to transmit an ACK or NACK for the downlink data message. The base station may determine to retransmit the downlink data message based on the predicted NACK message. For example, the base station may determine to retransmit the downlink data message based on a threshold associated with the predicted NACK message. As such, by receiving a predicted NACK message, the base station may retransmit a downlink data message earlier (e.g., as compared to a retransmission based on a HARQ ACK or NACK in the scheduled HARQ opportunity), thereby improving the efficiency and reducing the latency associated with the communications.

In some cases, the UE may communicate with one or more transmission and reception points (TRPs). The UE may receive the downlink data message from one TRP and may transmit the predicted NACK message to a second TRP. In some examples, the two TRPs may be components of the same base station or may correspond to different base stations. In some cases, the UE may operate in a full-duplex mode, in which the UE may transmit the predicted NACK to the second TRP while the UE is still receiving a portion of the downlink data message from the first TRP. Based on receiving the predicted NACK at the second TRP, the network may determine to begin preparing a retransmission of the downlink data message while the first TRP is still transmitting a portion of the downlink data message. The network (e.g., using the first TRP, the second TRP, or another TRP) may transmit the retransmission of the downlink data message to the UE.

In some examples, the UE may determine that the decoding process will likely fail based on one or more prediction metrics. For example, the UE may determine that the decoding process will likely fail based on a first NACK threshold. For example, a value for one or more signal-to-noise ratio (SNR) values, one or more signal-to-interference-plus-noise ratio (SINR) values, one or more reference signal received power (RSRP) values, one or more reference signal received quality (RSRQ) values, or a combination of these for one or more reference signals (e.g., demodulation reference signals (DMRSs), sounding reference signals (SRSs) or both) received from the base station (for example, with the downlink data message) may be above or below the first NACK threshold. Additionally or alternatively, the UE may determine that the decoding process will fail based on one or more log-likelihood ratios (LLRs) for a first set of the decoding stages, one or more path metrics for the first set of decoding stages, or a combination of these, being above or below a first NACK threshold. In one example, the UE may determine that an SNR value of one or more of the DMRSs (e.g., pilot DMRSs) is below a first NACK threshold, and the UE may transmit a predicted NACK message to the base station accordingly. Additionally or alternatively, the UE may determine that the decoding process will fail based on a first NACK threshold associated with a machine learning algorithm at the UE. The first NACK threshold may be configured by the base station, determined by (e.g., defined at) the UE, or otherwise configured. It is understood that the prediction of a decoding process failing based on the parameters described above is described with reference to said parameters being above or below the first NACK threshold because, depending on the parameter, the UE may predict a decoding failure when the parameter is above the first NACK threshold or the UE may predict a decoding failure when the parameter is below the first NACK threshold. For example, the UE may predict a decoding failure when an SNR or SINR value is above a first NACK SNR or SINR threshold, while the UE may predict a decoding failure when an RSRP or RSRQ value is below a first NACK RSRP or RSRQ threshold. In various examples, any combination of parameters may be compared with a first NACK threshold associated with each parameter to come to a final decoding failure prediction.

In some examples, the UE may transmit a capability message to the base station to indicate that the UE may be capable of transmitting predicted NACK messages. Additionally or alternatively, the base station may transmit a predicted NACK configuration message to the UE. One or more threshold values (e.g., first NACK threshold values) for the prediction metrics may be indicated via the capability message, the configuration message, or both. As such, the UE may transmit the predicted NACK message based on the threshold value of the prediction metric associated with the predicted NACK message, and the base station may determine to ignore the predicted NACK message or to retransmit the data message based on the threshold value. In some examples, the base station may track the predicted NACK messages received from the UE (e.g., store the results of previously-transmitted predicted NACK messages in a predicted NACK history), and the base station may determine a reliability associated with the predicted NACK messages based on the predicted NACK history. In one example, the base station may determine a reliability associated with the predicted NACK messages received from the UE based on a machine learning algorithm at the base station. As such, by receiving a predicted NACK message and determining whether to retransmit the corresponding downlink data message based on a reliability metric associated with the predicted NACK messages from a specific UE, the base station may determine whether to retransmit a downlink data message earlier than if the base station receives a NACK indication during a configured HARQ feedback opportunity.

Aspects of the disclosure are initially described in the context of wireless communications systems. Additional aspects are described with reference to communication timelines, machine learning algorithms, and process flows. Aspects of the disclosure are further illustrated by and described with reference to apparatus diagrams, system diagrams, and flowcharts that relate to early NACK indication for a data message.

FIG. 1 illustrates an example of a wireless communications system 100 that supports early NACK indication for a data message in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI) or a time period. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may be capable of transmitting a predicted NACK message to a base station 105. For example, the UE 115 may perform a decoding process (e.g., a sequential decoding process, such as a successive cancelation (SC) or SC list (SCL) decoding process) on a downlink data message received from a base station 105 (e.g., from a first TRP of the base station 105). In some cases, the UE 115 may determine that the decoding process is likely to fail based on one or more of the early decoding stages, one or more channel metrics, or any combination of these or other parameters associated with the decoding process. The UE 115 may compare the parameters associated with the decoding process (e.g., prior to completion of the decoding process) to a first NACK threshold to determine whether the decoding process is likely to fail, and the UE 115 may transmit a predicted NACK message to the base station 105 (e.g., the first TRP of the base station 105 or a second TRP of the base station 105) if the decoding process is predicted to fail. The UE 115 may generate and/or transmit the predicted NACK message before the UE 115 finishes decoding the downlink data message. For example, the predicted NACK message may be transmitted before the feedback occasion in which a feedback message including an ACK or NACK for the downlink data message may be transmitted. The base station 105 may determine to retransmit the downlink data message based on the predicted NACK message. For example, the base station 105 may determine to retransmit the downlink data message based on a retransmission threshold associated with the predicted NACK message. As such, by receiving predicted NACK messages, the base station 105 may retransmit downlink data messages earlier (e.g., as compared to a retransmission based on a HARQ message in the scheduled HARQ opportunity), thereby improving the efficiency and reducing the latency associated with the communications.

Figure 2:
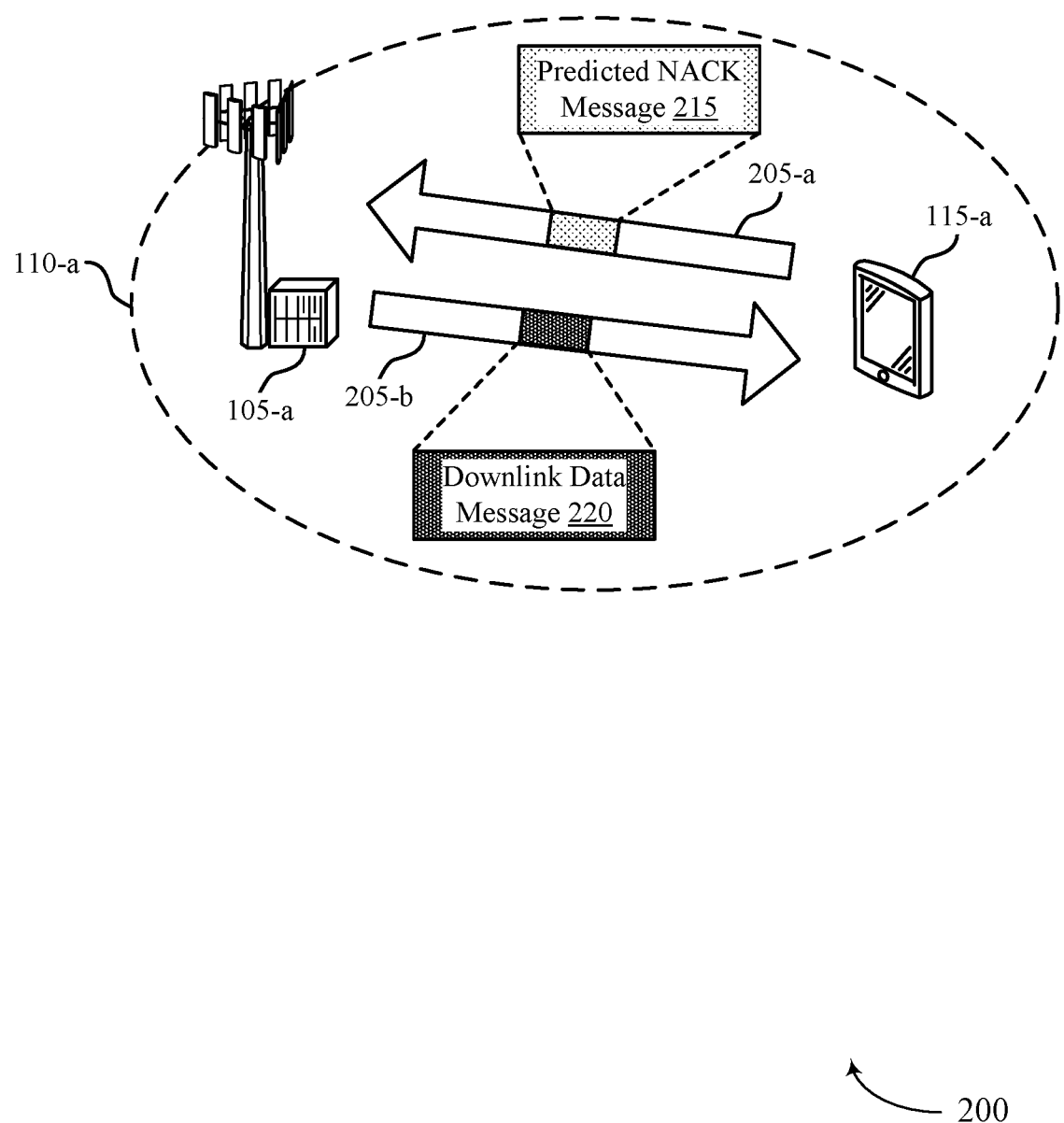

FIG. 2 illustrates an example of a wireless communications system 200 that supports early NACK indication for a data message in accordance with aspects of the present disclosure. The wireless communications system 200 may include base station 105-*a* and UE 115-*a*, which may be examples of a base station 105 and a UE 115 as described with reference to FIG. 1. Base station 105-*a* and UE 115-*a* may communicate within a geographic coverage area 110-*a* and over a communication link, which may include one or more uplink channels 205-*a* and one or more downlink channels 205-*b*. Base station 105-*a* may transmit a downlink data message 220 to UE 115-*a* via downlink channel 205-*b*. In some implementations of the present disclosure, UE 115-*a* may transmit a predicted NACK message 215 to base station 105-*a* via uplink channel 205-*a* in response to the downlink data message 220.

In some examples of the wireless communications system 200, a UE 115 may transmit a feedback message, such as a HARQ message including one or more ACK and/or NACK indications, to a base station 105 as a result of a decoding process performed on a downlink data message 220. For example, the UE 115 may receive the downlink data message 220, and the UE 115 may perform a decoding process for the downlink data message 220. The UE 115 may perform a checking function (e.g., a cyclic redundancy check (CRC) function) to determine whether the decoding process is successful for the downlink data message 220. The UE 115 may transmit a result of the decoding process (e.g., an ACK or a NACK based on a result of the checking function) for the downlink data message 220 via a feedback message to the base station 105 during a feedback opportunity configured or indicated by the base station 105 or another network device. A feedback opportunity may be configured for the UE 115 to provide HARQ feedback in response to each downlink data message 220. For example, if UE 115-a successfully receives and decodes a downlink data message 220, UE 115-a may transmit a message indicating an ACK to base station 105-a. If base station 105-a receives an ACK, base station 105-a may determine that the corresponding downlink data message 220 was successfully transmitted to UE 115-a. Additionally or alternatively, if UE 115-a fails to receive or decode the downlink data message 220, UE 115-a may transmit a message indicating a NACK to base station 105-a. If base station 105-a receives a NACK from UE 115-a for a downlink data message 220, base station 105-a may determine to retransmit the downlink data message 220 to UE 115-a. The described feedback procedure may repeat until UE 115-a successfully receives and decodes the downlink data message 220, UE 115-a transmits an ACK to base station 105-a, or a timeline for the communications ends (e.g., UE 115-a may be configured to receive the downlink data message 220 within a reference time, such as 5 milliseconds (ms), 10 ms, 15 ms, or some other time frame).

There may be one or more processing timelines associated with transmitting the downlink data message 220 to a UE 115. For example, the downlink data message 220 may be transmitted by a base station 105 at a first time, and based on a decoding process at the UE 115, the downlink data message 220 may be retransmitted by the base station 105 at a second time following the first time. In some examples, the second time may occur after a first time period for processing at the UE 115 and a second time period for processing at the base station 105. The first time period may be configured for the UE 115 to decode the downlink data message 220 and transmit a feedback message indicating an ACK or NACK. The first time period may correspond to a first offset value, such as K1, that may span from the end of a time period allocated for downlink data transmissions, such as a downlink slot, to the beginning of a HARQ feedback opportunity. The second time period may be configured for the base station 105 to decode the feedback message indicating the ACK or NACK and prepare to retransmit the downlink data message 220 accordingly. The second time period may correspond to a second cycle period, such as K3, that may span from the end of the NACK transmission to the first symbol of the retransmission of the downlink data message 220. In some cases, the base station 105 may retransmit the downlink data message 220 multiple times, and the cycle period for each retransmission may be the length of the first time period and the second time period combined (e.g., it may take a time period of at least K1+K3 to retransmit the downlink data message 220). Communicating according to the described processing timelines for communications may result in significant latency during communications.

As described herein, UE 115-a may be configured to predict if a decoding process will fail, and UE 115-a may transmit a predicted NACK message 215. The predicted NACK message 215 may be transmitted according to a shorter timeline than a HARQ message including a NACK indication for a completed decoding process. For example, the process of decoding the downlink data message 220 at UE 115-a may include one or more decoding stages, and UE 115-a may predict whether the decoding process is likely to fail according to one or more of the early decoding stages (e.g., in a sequential decoding process). As such, UE 115-a may transmit a predicted NACK message 215 prior to completion of the decoding process. For example, if UE 115-a predicts that a decoding process is likely to fail, UE 115-a may preemptively transmit the predicted NACK message 215 to base station 105-a before or concurrent to decoding the remainder of downlink data message 220. Because the predicted NACK message 215 may be transmitted before the last symbol of a downlink slot, the processing timeline for communications may be reduced (e.g., the time periods K1 and K3 may overlap, such that the downlink data message 220 may be retransmitted within a time period equal to the second cycle period, K3, instead of a total cycle period equal to K1+K3, as described in more detail with reference to FIG. 4).

In some examples, UE 115-a may transmit a capability message to base station 105-a. The capability message may include an indication that UE 115-a may be capable of transmitting the predicted NACK messages 215, a processing timeline value for UE 115-a to transmit the predicted NACK messages 215, or a combination of these. Additionally or alternatively, base station 105-a may transmit a configuration message for predicted NACK messages 215 to UE 115-a. The configuration message may include timing for transmitting the predicted NACK message 215, a retransmission threshold for retransmission of the downlink data message 220 at base station 105-a (e.g., where the retransmission threshold may be associated with or otherwise define a threshold reliability associated with the predicted NACK message 215 or a threshold probability that the predicted NACK message 215 is correct), or a combination of these. In some examples, UE 115-a may transmit the predicted NACK message 215 based on the information included in the capability message, the configuration message, or both.

UE 115-a may predict if the decoding process will fail based on one or more first NACK thresholds associated with one or more measurements obtained during the decoding process, one or more first NACK thresholds associated with one or more decoding metrics associated with the downlink data message 220, or both. In one example, UE 115-a may determine that the decoding process is likely to fail and the predicted NACK message 215 should be transmitted based on a poor channel quality. For example, UE 115-a may determine a poor channel quality based on a measurement value for one or more DMRSs received with the downlink data message 220, such as one or more SNR values, one or more SINR values, one or more RSRP values, one or more RSRQ values, or a combination of these for one or more DMRSs received concurrent with the downlink data message 220. Additionally or alternatively, UE 115-a may determine that the decoding process is likely to fail based on one or more decoding metrics obtained during the initial stages of the decoding process. For example, UE 115-a may identify one or more poor LLRs associated with the downlink data message 220 (e.g., LLRs failing to satisfy a specific first NACK threshold LLR value), one or more poor path metrics for a first set of decoding stages (e.g., path metrics failing to satisfy a specific first NACK threshold path metric value), or a combination of these that may indicate to UE 115-*a* that the decoding process may be likely to fail. In some examples, the LLRs, path metrics, or both may indicate that UE 115-*a* is not confident about the accuracy of any specific set of decoded bits.

In one example, UE 115-*a* may determine that an SNR value for a DMRS received with the downlink data message 220 is less than a first NACK threshold, and UE 115-*a* may transmit a predicted NACK message 215 to base station 105-*a* accordingly (e.g., before the decoding process is complete). Additionally or alternatively, UE 115-*a* may determine whether the decoding process is likely to fail according to a machine learning algorithm at UE 115-*a* (e.g., based on a first NACK threshold associated with the machine learning algorithm). For example, UE 115-*a* may track each of a set of decoding processes (e.g., store the results of previous decoding processes in a decoding history), and UE 115-*a* may train the machine learning algorithm based on the tracked processes and a corresponding set of decoding parameters. In some examples, UE 115-*a* may provide a set of decoding parameters for each downlink data message 220 to the machine learning algorithm, and the machine learning algorithm may predict whether the decoding process for the downlink data message 220 is likely to fail (e.g., with a predicted probability of failure satisfying a first NACK threshold).

In some examples, UE 115-*a* may perform an iterative decoding process, such as a turbo decoding process, a low-density parity-check (LDPC) decoding process, or some other iterative decoding process. The iterative decoding process may correspond to some quantity, n, of iterations. If UE 115-*a* inputs intermediate parameters generated by the decoding process to a machine-learned algorithm prior to completion of the n iterations, UE 115-*a* may determine whether the decoding process is predicted to fail (e.g., according to an output of the machine-learned algorithm) relatively faster than if UE 115-*a* does not use the machine-learned algorithm. For example, UE 115-*a* may determine whether the decoding process is likely to fail in k iterations of the decoding process, where k is smaller than n.

The predicted NACK message 215 may indicate one or more retransmission parameters to base station 105-*a* that base station 105-*a* may use to determine whether to retransmit the downlink data message 220. For example, the predicted NACK message 215 may include an indication of a level of confidence (e.g., a confidence bit field indicating a level of confidence that the decoding process at UE 115-*a* is likely to fail), a cause for predicting the NACK, an indication of the corresponding downlink data message 220, one or more additional parameters associated with the predicted NACK message 215 or the downlink data message 220, or a combination of these. In some examples, the predicted NACK message may be a HARQ NACK message. For example, the predicted NACK message 215 may be the same as a NACK indication transmitted via a HARQ feedback opportunity (e.g., based on a second NACK threshold associated with a complete decoding process), but the predicted NACK message 215 may be transmitted during a predicted NACK occasion prior to the HARQ feedback opportunity. Additionally or alternatively, the predicted NACK message 215 may be some other message that includes an early indication of a NACK.

Base station 105-*a* may receive a predicted NACK message 215 prior to a scheduled HARQ feedback opportunity (e.g., during the downlink slot in which the downlink data message 220 was transmitted), for example, according to an indication received in the capability message transmitted by UE 115-*a* or the configuration message transmitted by base station 105-*a*. Base station 105-*a* may prepare to retransmit a corresponding downlink data message 220 based on one or more prediction metrics associated with the predicted NACK message 215. Base station 105-*a* may reduce latency by preparing to retransmit the corresponding downlink data message 220 based on the prediction metrics. For example, base station 105-*a* may prepare a packet for retransmission prior to the scheduled HARQ feedback opportunity, such that base station 105-*a* may retransmit the packet relatively faster than if base station 105-*a* did not receive the predicted NACK message 215. Additionally or alternatively, base station 105-*a* may determine to ignore the predicted NACK message 215 based on the one or more prediction metrics (e.g., as compared to one or more retransmission thresholds), and base station 105-*a* may instead wait to receive an ACK or NACK during the configured HARQ feedback opportunity. The prediction metrics may include a first NACK threshold, a level of confidence, a probability that the decoding process at UE 115-*a* will fail, one or more prediction metrics included in the predicted NACK message 215, one or more prediction metrics indicated by a machine learning process at UE 115-*a* or at base station 105-*a*, or a combination of these.

In some examples, the predicted NACK message 215 may include a level of confidence (e.g., a probability that the decoding process will actually be unsuccessful and result in a NACK) that may be determined based on one or more decoding parameters, one or more prediction metrics, or a machine learning process at UE 115-*a*. Base station 105-*a* may configure a retransmission threshold probability for preparing a retransmission in response to the predicted NACK message 215. For example, base station 105-*a* may determine to ignore a predicted NACK message 215 if the probability associated with the predicted NACK message is below the configured retransmission threshold (e.g., less than a 50% probability).

Additionally or alternatively, base station 105-*a* may track the predicted NACK messages 215. For example, base station 105-*a* may store results of previously transmitted predicted NACK messages 215 in a predicted NACK history at base station 105-*a*, or base station 105-*a* may provide the predicted NACK messages 215 to a machine learning algorithm. Base station 105-*a* may determine a reliability associated with the predicted NACK messages 215 transmitted by UE 115-*a* based on the history of predicted NACK messages 215, the machine learning algorithm, or a combination of these. Base station 105-*a* may determine to ignore a predicted NACK message 215 if the reliability associated with the predicted NACK message 215, the reliability associated with UE 115-*a* transmitting the predicted NACK message 215, or some combination thereof is below a retransmission threshold. As such, by determining whether to retransmit the downlink data message 220 in response to a predicted NACK message 215 based on a set of prediction metrics, base station 105-*a* may retransmit the downlink data message 220 with a reduced latency and improved efficiency, which may potentially provide for additional retransmissions within a configured communication timeline.

The predicted NACK message 215 may be transmitted via a configured uplink resource. The uplink resource may be determined based on a processing timeline value, a starting symbol for receiving the downlink data message 220, an indication in the configuration message transmitted by base station 105-a, an indication in the capability message transmitted by UE 115-a, a mode of communications, or a combination of these. In one example, the uplink resource for transmitting the predicted NACK message 215 may be determined based on the starting symbol for receiving the downlink data message 220 and a first timeline for processing at UE 115-a. The first timeline may be a time period after UE 115-a receives the first symbol of downlink data message 220 in which UE 115-a may determine to transmit a predicted NACK message 215. In another example, UE 115-a may indicate a resource for transmitting the predicted NACK message 215 to base station 105-a via the capability message. Additionally or alternatively, base station 105-a may indicate a resource for transmitting the predicted NACK message 215 to UE 115-a via the configuration message. In some examples, UE 115-a may be configured to operate in a half-duplex communications mode (e.g., as opposed to operating in an FDD communication mode, a TDD full-duplex communication mode, or a TDD subband full-duplex communication mode, such that UE 115-a may receive the downlink data message 220 and transmit a predicted NACK message 215 concurrently). In some such examples, the uplink resource for transmitting predicted NACK messages 215 may be configured as a dedicated resource (e.g., a dedicated mini-slot for transmitting the predicted NACK message 215), such that UE 115-a may transmit the predicted NACK message 215 before receiving the remainder of the downlink data message 220 or other downlink messages in a downlink slot.

In some examples, an ACK or NACK indication may additionally be transmitted by UE 115-a during a feedback opportunity based on a result of a completed decoding process for a downlink data message 220. For example, UE 115-a may use a second NACK threshold associated with a complete decoding process (e.g., a complete decoding process that indicates an error in decoding or otherwise fails to successfully decode information) to determine whether to transmit a NACK indication in a HARQ feedback opportunity. The second NACK threshold may be satisfied if an error correction code (e.g., a CRC) fails for the completed decoding process or if UE 115-a otherwise determines that the decoding process failed upon completing the decoding process. The feedback opportunity for transmitting HARQ ACK or NACK indications may be determined according to a second timeline for processing at UE 115-a. The second timeline may include a time for UE 115-a to decode the entire downlink data message 220. As such, the second timeline may be longer than the first timeline for transmitting predicted NACK messages 215, and the predicted NACK message 215 may be transmitted prior to the actual HARQ message. If base station 105-a determines to ignore the predicted NACK message 215, base station 105-a may determine whether to retransmit the downlink data message 220 based on an ACK or NACK received during the HARQ feedback opportunity. If base station 105-a receives a predicted NACK message 215 during a predicted NACK occasion and an ACK or NACK during the feedback opportunity, base station 105-a may determine the reliability of the predicted NACK message 215 based on the ACK or NACK indication (e.g., the predicted NACK message 215 may be reliable if the HARQ message received during the feedback opportunity matches the prediction).

As described herein, a UE 115 may transmit a predicted NACK message 215 before completing a decoding process for a downlink data message 220, which may improve a processing timeline for communications between the UE 115 and a base station 105. The base station 105 may thus receive and decode the predicted NACK message 215 earlier than an actual feedback message indicating a NACK, and the base station 105 may determine to retransmit the downlink data message 220 at an earlier time. As such, the base station 105 may potentially support more retransmissions of the downlink data message 220 within a communication timeline and thus the predicted NACK messages 215 may improve efficiency and reduce processing latency associated with the communications. Thus, predicted NACK messages 215 may improve communications for latency-sensitive services and transmission of high priority messages (e.g., the quick retransmission time due to the predicted NACK messages 215 may significantly improve UE 115 performance). For example, predicted NACK messages 215 may be used to improve latency involved in one or more of ultra-reliable low-latency communication (URLLC), industrial IoT, or extended reality (XR) use cases.

Figure 3:
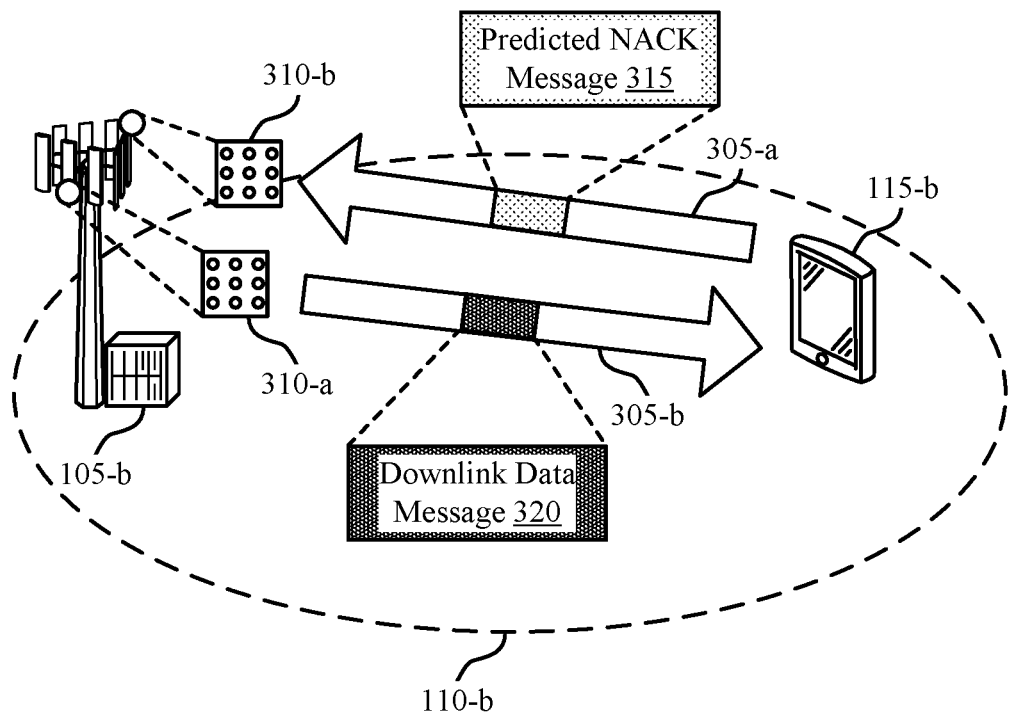

FIG. 3 illustrates an example of a wireless communications system 300 that supports early NACK indication for a data message in accordance with aspects of the present disclosure. In some examples, the wireless communications system 300 may implement aspects of wireless communications systems 100 and 200. The wireless communications system 300 may include base station 105-b and UE 115-b, which may be examples of a base station 105 and a UE 115 as described with reference to FIGS. 1 and 2. Base station 105-b and UE 115-b may communicate within a geographic coverage area 110-b and over a communication link, which may include one or more uplink channels 305-a and one or more downlink channels 305-b. Base station 105-b may include at least two TRPs, first TRP 310-a and second TRP 310-b. In other examples, three or more TRPs may be used consistent with the techniques described herein. In some cases, TRP 310-a and TRP 310-b may be associated with different base stations 105, rather than the same base station 105-b. The TRPs 310 may communicate with other TRPs 310 over backhaul links (e.g., non-ideal backhaul links), and the TRPs 310 may communicate with base stations 105 over backhaul links (e.g., such as on a X3 or Xn interface). Base stations 105 with separate TRPs 310 may also communicate according to a X3 or Xn interface, including with backhaul links.

TRP 310-a of base station 105-b may transmit a downlink data message 320 to UE 115-b via downlink channel 305-b. In some examples, UE 115-b may transmit a predicted NACK message 315 to TRP 310-b of base station 105-b via uplink channel 305-a in response to the downlink data message 320. In some cases, UE 115-b may transmit the predicted NACK message 315 to TRP 310-b while TRP 310-a is still transmitting downlink data message 320 (e.g., at least a portion of the downlink data message 320).

In some examples of the wireless communications system 300, a UE 115 may transmit a feedback message, such as a HARQ message including one or more ACK and/or NACK indications, to a TRP 310 (e.g., of base station 105-b or a different base station 105) as a result of a decoding process performed on a downlink data message 320. For example, the UE 115 may receive the downlink data message 320, and the UE 115 may perform a decoding process for the downlink data message 320. The UE 115 may perform a checking function (e.g., a CRC function) to determine whether the decoding process is successful for the downlink data message 320. The UE 115 may transmit a result of the decoding process (e.g., an ACK or a NACK based on a result of the checking function) for the downlink data message 320 via a feedback message to TRP 310-b of base station 105-b during a feedback opportunity configured or indicated by the base station 105 or another network device. A feedback opportunity may be configured for the UE 115 to provide HARQ feedback in response to each downlink data message 320. For example, if UE 115-b successfully receives and decodes a downlink data message 320, UE 115-b may transmit a message indicating an ACK to base station 105-b. If TRP 310-b receives an ACK, base station 105-b may determine that the corresponding downlink data message 320 was successfully transmitted to UE 115-b. Additionally or alternatively, if UE 115-b fails to receive or decode the downlink data message 320, UE 115-b may transmit a message indicating a NACK to TRP 310-b. If TRP 310-b of base station 105-b receives a NACK from UE 115-b for a downlink data message 320, base station 105-b may determine to retransmit the downlink data message 320 to UE 115-b. For example, TRP 310-b may receive predicted NACK message 315 from UE 115-b. Base station 105-b may begin preparing a retransmission of downlink data message 320 in response to the predicted NACK message 315, in some cases while TRP 310-a is still transmitting at least a portion of the initial downlink data message 320.

The described feedback procedure may repeat until UE 115-b successfully receives and decodes the downlink data message 320, UE 115-b transmits an ACK to TRP 310-b, or a timeline for the communications ends (e.g., UE 115-b may be configured to receive the downlink data message 320 within a reference time, such as 5 milliseconds (ms), 10 ms, 15 ms, or some other time frame).

There may be one or more processing timelines associated with transmitting the downlink data message 320 to a UE 115. For example, the downlink data message 320 may be transmitted by TRP 310-a at a first time, and based on a decoding process at the UE 115, the downlink data message 320 may be retransmitted by TRP 310-a at a second time following the first time. In some examples, the second time may occur after a first time period for processing at the UE 115 and a second time period for processing at the base station 105. The first time period may be configured for the UE 115 to decode the downlink data message 320 and transmit a feedback message indicating an ACK or NACK. The first time period may correspond to a first offset value, such as K1, that may span from the end of a time period allocated for downlink data transmissions, such as a downlink slot, to the beginning of a HARQ feedback opportunity. The second time period may be configured for the base station 105 to decode the feedback message indicating the ACK or NACK and prepare to retransmit the downlink data message 320 accordingly. The second time period may correspond to a second cycle period, such as K3, that may span from the end of the NACK transmission to the first symbol of the retransmission of the downlink data message 320. In some cases, TRP 310-a may retransmit the downlink data message 320 multiple times, and the cycle period for each retransmission may be the length of the first time period and the second time period combined (e.g., it may take a time period of at least K1+K3 to retransmit the downlink data message 320). Communicating according to the described processing timelines for communications may result in significant latency during communications.

As described herein, UE 115-b may be configured to predict if a decoding process will fail, and UE 115-b may transmit a predicted NACK message 315. The predicted NACK message 315 may be transmitted according to a shorter timeline than a HARQ message including a NACK indication for a completed decoding process. For example, the process of decoding the downlink data message 320 at UE 115-b may include one or more decoding stages, and UE 115-b may predict whether the decoding process is likely to fail according to one or more of the early decoding stages (e.g., in a sequential decoding process). As such, UE 115-b may transmit a predicted NACK message 315 prior to completion of the decoding process. For example, if UE 115-b predicts that a decoding process is likely to fail, UE 115-b may preemptively transmit the predicted NACK message 315 to TRP 310-b before or concurrent to decoding the remainder of the downlink data message 320. Because the predicted NACK message 315 may be transmitted before the last symbol of a downlink slot, the processing timeline for communications may be reduced (e.g., the time periods K1 and K3 may overlap, such that the downlink data message 320 may be retransmitted within a time period equal to the second cycle period, K3, instead of a total cycle period equal to K1+K3, as described in more detail with reference to FIG. 4).

In some examples, UE 115-b may transmit a capability message to base station 105-b, as described with reference to FIG. 2. Additionally or alternatively, UE 115-b may predict if the decoding process will fail based on one or more measurements obtained during the decoding process, one or more decoding metrics associated with the downlink data message 320, or both, as described with reference to FIG. 2. UE 115-b may transmit a predicted NACK message 315 based on predicting that the decoding process will fail (e.g., using a first NACK threshold associated with an incomplete decoding process).

The predicted NACK message 315 may indicate one or more retransmission parameters to TRP 310-b that TRP 310-b or base station 105-b may use to determine whether to retransmit the downlink data message 320. For example, the predicted NACK message 315 may include an indication of a level of confidence (e.g., a confidence bit field indicating a level of confidence that the decoding process at UE 115-b is likely to fail), a cause for predicting the NACK, an indication of the corresponding downlink data message 320, one or more additional parameters associated with the predicted NACK message 315 or the downlink data message 320, or a combination of these. In some examples, the predicted NACK message 315 may be a HARQ NACK message. For example, the predicted NACK message 315 may be the same as a NACK indication transmitted via a HARQ feedback opportunity, but the predicted NACK message 315 may be transmitted during a predicted NACK occasion prior to the HARQ feedback opportunity. Additionally or alternatively, the predicted NACK message 315 may be some other message that includes an early indication of a NACK.

Base station 105-b may receive a predicted NACK message 315 prior to a scheduled HARQ feedback opportunity (e.g., during the downlink slot in which the downlink data message 320 was transmitted), for example, according to an indication received in the capability message transmitted by UE 115-b or the configuration message transmitted by base station 105-b. Base station 105-b may prepare to retransmit a corresponding downlink data message 320 based on one or more prediction metrics associated with the predicted NACK message 315. For example, base station 105-b may determine to ignore the predicted NACK message 315 based on the one or more prediction metrics and one or more retransmission thresholds, and base station 105-b may instead wait to receive an ACK or NACK during the configured HARQ feedback opportunity. The prediction metrics may include a first NACK threshold, a level of confidence, a probability that the decoding process at UE 115-b will fail, one or more prediction metrics included in the predicted NACK message 315, one or more prediction metrics indicated by a machine learning process at UE 115-*b* or at base station 105-*b*, or a combination of these.

In some examples, the predicted NACK message 315 may include a level of confidence (e.g., a probability that the decoding process will actually be unsuccessful and result in a NACK) that may be determined based on one or more decoding parameters, one or more prediction metrics, or a machine learning process at UE 115-*b*. Base station 105-*b* may configure a retransmission threshold probability for preparing a retransmission in response to the predicted NACK message 315. For example, base station 105-*b* may determine to ignore a predicted NACK message 315 if the probability associated with the predicted NACK message is below the configured retransmission threshold (e.g., less than a 50% probability).

Additionally or alternatively, base station 105-*b* may track the predicted NACK messages 315. For example, base station 105-*b* may store results of previously transmitted predicted NACK messages 315 in a predicted NACK history at base station 105-*b*, or base station 105-*b* may provide the predicted NACK messages 315 to a machine learning algorithm. Base station 105-*b* may determine a reliability associated with the predicted NACK messages 315 transmitted by UE 115-*b* based on the history of predicted NACK messages 315, the machine learning algorithm, or a combination of these. Base station 105-*b* may determine to ignore a predicted NACK message 315 if the reliability associated with the predicted NACK message 315, the reliability associated with UE 115-*b* transmitting the predicted NACK message 315, or some combination thereof is below a retransmission threshold. As such, by determining whether to retransmit the downlink data message 320 in response to a predicted NACK message 315 based on a set of prediction metrics, base station 105-*b* may retransmit the downlink data message 320 with a reduced latency and improved efficiency, which may potentially provide for additional retransmissions within a configured communication timeline.

The predicted NACK message 315 may be transmitted via a configured uplink resource. The uplink resource may be determined based on a processing timeline value, a starting symbol for receiving the downlink data message 320, an indication in the configuration message transmitted by base station 105-*b*, an indication in the capability message transmitted by UE 115-*b*, a mode of communications, or a combination of these. In one example, the uplink resource for transmitting the predicted NACK message 315 may be determined based on the starting symbol for receiving the downlink data message 320 and a first timeline for processing at UE 115-*b*. The first timeline may be a time period after UE 115-*b* receives the first symbol of downlink data message 320 in which UE 115-*b* may determine to transmit a predicted NACK message 315. In another example, UE 115-*b* may indicate a resource for transmitting the predicted NACK message 315 to base station 105-*b* via the capability message. Additionally or alternatively, base station 105-*b* may indicate a resource for transmitting the predicted NACK message 315 to UE 115-*b* via the configuration message. In some examples, UE 115-*b* may be configured to operate in a half-duplex communications mode (e.g., as opposed to operating in an FDD communication mode, a TDD full-duplex communication mode, or a TDD subband full-duplex communication mode, such that UE 115-*b* may receive the downlink data message 320 and transmit a predicted NACK message 315 concurrently). In some such examples, the uplink resource for transmitting predicted NACK messages 315 may be configured as a dedicated resource (e.g., a dedicated mini-slot for transmitting the predicted NACK message 315), such that UE 115-*b* may transmit the predicted NACK message 315 before receiving the remainder of the downlink data message 320 or other downlink messages in a downlink slot. In other cases, UE 115-*b* may use a different beam configuration to transmit the predicted NACK message 315 to TRP 310-*b* than the beam configuration used to receive downlink data message 320.

In some examples, an ACK or NACK indication may additionally be transmitted by UE 115-*b* during a feedback opportunity based on a result of a completed decoding process for a downlink data message 320 (e.g., based on a second NACK threshold for the complete decoding process). The feedback opportunity for transmitting HARQ ACK or NACK indications may be determined according to a second timeline for processing at UE 115-*b*. The second timeline may include a time for UE 115-*b* to decode the entire downlink data message 320. As such, the second timeline may be longer than the first timeline for transmitting predicted NACK messages 315, and the predicted NACK message 315 may be transmitted prior to the actual HARQ message. If base station 105-*b* determines to ignore the predicted NACK message 315, base station 105-*b* may determine whether to retransmit the downlink data message 320 based on an ACK or NACK received during the HARQ feedback opportunity. If TRP 310-*b* receives a predicted NACK message 315 during a predicted NACK occasion and an ACK or NACK during the feedback opportunity, base station 105-*b* may determine the reliability of the predicted NACK message 315 based on the ACK or NACK indication (e.g., the predicted NACK message 315 may be reliable if the HARQ message received during the feedback opportunity matches the prediction).

As described herein, a UE 115 may transmit a predicted NACK message 315 before completing a decoding process for a downlink data message 320, which may improve a processing timeline for communications between the UE 115 and a base station 105. The base station 105 may thus receive and decode the predicted NACK message 315 earlier than an actual feedback message indicating a NACK, and the base station 105 or TRP 310-*b* may determine to retransmit the downlink data message 320 at an earlier time. As such, the base station 105 may potentially support more retransmissions of the downlink data message 320 within a communication timeline, and thus the predicted NACK messages 315 may improve efficiency and reduce processing latency associated with the communications. Further, when UE 115-*b* transmits the predicted NACK message 315 to TRP 310-*b* while TRP 310-*a* is still transmitting a portion of the downlink data message 320, TRP 310-*b* may begin preparing the retransmission of downlink data message 320, which may further decrease latency, as the retransmission may be prepared according to a more efficient timeline. Thus, predicted NACK messages 315 may improve communications for latency-sensitive services and transmission of high priority messages (e.g., the relatively quick retransmission time due to the predicted NACK messages 315 may significantly improve UE 115 performance). For example, predicted NACK messages 315 may be used to improve latency involved in one or more of URLLC, industrial IoT, or XR use cases.

Figure 4:
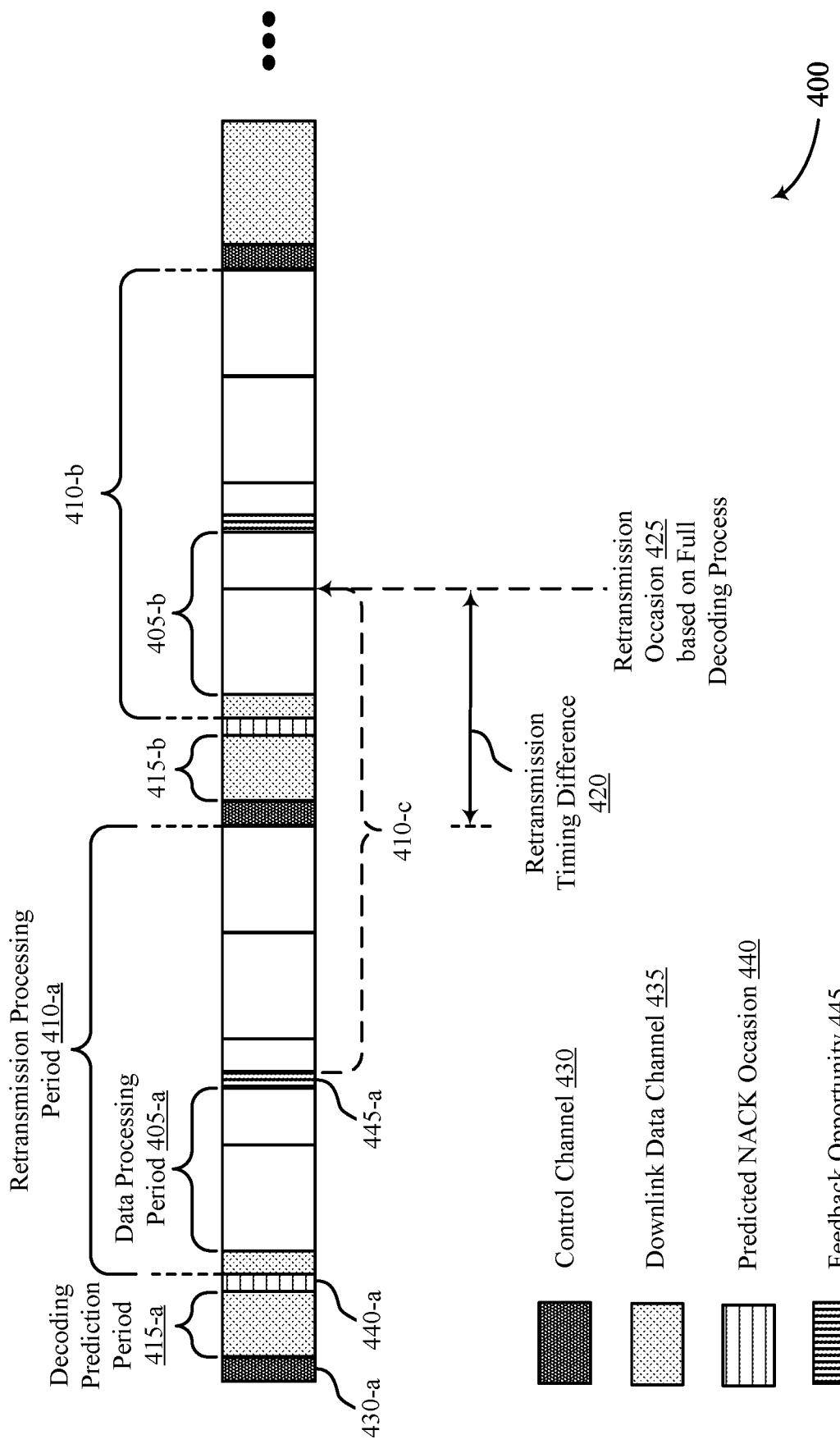
FIG. 4 illustrates an example of a communication timeline that supports early NACK indication for a data message in accordance with aspects of the present disclosure.

FIG. 4 illustrates an example of a communication timeline 400 that supports early NACK indication for a data message in accordance with aspects of the present disclosure. In some examples, the communication timeline 400 may implement aspects of wireless communications systems 100, 200, and 300. The communication timeline 400 may include resources allocated for a downlink data channel 435, in which a base station 105 may transmit a downlink data message to a UE 115. Such a downlink data message may be an example of the downlink data message described with reference to FIGS. 2 and 3. In some examples, the downlink data message may be transmitted a number of times during the communication timeline 400. The downlink data message may be transmitted in accordance with a control message received over resources allocated for a downlink control channel 430 (e.g., a control message transmitted via a physical downlink control channel (PDCCH) that may indicate resources for transmitting the downlink data message). The communication timeline 400 may include one or more predicted NACK occasions 440 and one or more feedback opportunities 445. As described herein, a UE 115—such as a UE 115 described with reference to FIGS. 1 through 3—may transmit one or more predicted NACK messages via the predicted NACK occasions 440, which may provide an opportunity for a base station 105 to increase a number of times the base station 105 may retransmit the downlink data message during the communication timeline 400. In some examples, a first TRP of the base station 105 may transmit the downlink data message(s) and a second TRP of the base station 105 may receive the one or more predicted NACK messages.

The communication timeline 400 may include one or more processing timelines associated with communications between the UE 115 and the base station 105. For example, the communication timeline 400 may include one or more data processing periods 405 (e.g., data processing periods 405-a and 405-b). The data processing periods 405 may correspond to a time period (e.g., a number of symbols, slots, mini-slots, TTIs, or the like) configured for a UE 115 to decode a downlink data message and transmit a feedback message for the downlink data message, such as an ACK or NACK, during a feedback opportunity 445 (e.g., a first cycle period for processing a downlink data message at the UE 115, such as a cycle period K1). Each data processing period 405 may offset the feedback opportunity 445 an amount of time from the last symbol of the downlink data channel 435 to support processing of a downlink data message and preparation of a corresponding HARQ message for feeding back information. Additionally or alternatively, the communication timeline 400 may include one or more retransmission processing periods 410 (e.g., retransmission processing periods 410-a, 410-b, and 410-c). The retransmission processing periods 410 may correspond to a time period configured for the base station 105 to receive a NACK indication (e.g., a predicted or actual NACK indication) and prepare to retransmit the corresponding downlink data message. In some examples, a first TRP of the base station 105 may receive the NACK indication and prepare to retransmit the corresponding downlink data message during the retransmission processing period 410 while a second TRP of the base station 105 may be transmitting a remaining portion of the downlink data message. In some examples, each retransmission processing period 410 may be configured with a pre-determined cycle period. For example, retransmission processing periods 410-a, 410-b, and 410-c may be based on an offset value K3.

In some examples of the communication timeline 400, the UE 115 may transmit an ACK or a NACK for the first downlink data message to the base station 105 during feedback opportunity 445-a after data processing period 405-a. The feedback opportunities 445 may be configured by the base station 105 or another network entity for the UE 115 to provide HARQ feedback in response to one or more downlink data messages, and each feedback opportunity 445 may occur after a data processing period 405. In one example, the UE 115 may decode the downlink data message during data processing period 405-a (e.g., a first cycle period, such as K1, that may span from the last symbol of the downlink data slot to the beginning of the HARQ feedback opportunity). The UE 115 may transmit an indication of an ACK or a NACK to the base station 105 during feedback opportunity 445-a. If the base station 105 receives a NACK during feedback opportunity 445-a, the base station 105 may decode the NACK message and prepare to retransmit the downlink data message during retransmission processing period 410-c (e.g., a second cycle period, such as K3, that may span from the end of the NACK transmission to the first symbol of the retransmission of the downlink data message). Additionally or alternatively, if a TRP of the base station 105 receives a NACK during feedback opportunity 445-a, the base station 105 may decode the NACK message and may prepare to retransmit the downlink data message using the TRP or another TRP during retransmission processing period 410-c. As such, if the base station 105 receives a NACK during feedback opportunity 445-a, the base station 105 may retransmit the downlink data message at the downlink data retransmission occasion 425 based on a full decoding process at the UE 115.

As described herein, the UE 115 may be configured to transmit a predicted NACK message during a predicted NACK occasion 440. For example, the UE 115 may transmit a capability message to the base station 105, which may indicate to the base station 105 that the UE 115 is capable of transmitting predicted NACK messages. Additionally or alternatively, the base station 105 may transmit a predicted NACK configuration message to the UE 115, which may indicate timing for transmitting the predicted NACK message (e.g., the timing of the decoding prediction periods 415) or a threshold for retransmission of the downlink data message in response to the predicted NACK message. In some examples, the predicted NACK occasions 440 may occur in the same slot used for transmitting the downlink data message (e.g., intra-slot transmission). Additionally or alternatively, the predicted NACK occasions 440 may be dedicated resources for transmitting predicted NACK messages (e.g., during half-duplex communications), or the predicted NACK occasions 440 may occur after a partial set of slots allocated for a downlink data channel 435 (e.g., after a set of slot repetitions and prior to an end of the repeated downlink slots).

In some examples, the predicted NACK may shorten the timeline for retransmitting the downlink data message. For example, if the base station 105 receives a predicted NACK during predicted NACK occasion 440-a, the base station 105 may retransmit the downlink data message after retransmission processing period 410-a. Thus, the base station 105 may retransmit the downlink data message earlier in response to a predicted NACK message received during predicted NACK occasion 440-a than in response to a NACK indication received during feedback opportunity 445-a. Further, in some cases, the UE 115 may transmit the predicted NACK to a second TRP of the base station while receiving the ongoing downlink data transmission from a first TRP, further reducing the processing and transmission timeline. An example potential reduction in the timeline for retransmitting a downlink data message if the base station 105 receives a predicted NACK message may be shown by the retransmission timing difference 420.

The UE 115 may transmit a predicted NACK message if the UE 115 determines that a decoding process for the corresponding downlink data message is likely to fail. For example, the UE 115 may receive a downlink data message, and the UE 115 may perform a decoding process on the downlink data message. In the example of the communication timeline 400, the UE 115 may perform one or more decoding prediction processes during the decoding prediction periods 415 (e.g., decoding prediction periods 415-*a* and 415-*b*). The decoding prediction periods 415 may allow for the UE 115 to receive the downlink data message and perform a set of initial decoding processes to determine whether the decoding process is predicted to fail. For example, the timeline for the decoding prediction periods 415 may be based on a processing capability of the UE 115 to perform a subset of decoding processes, determine whether the decoding process is predicted to fail, and prepare a predicted NACK message for transmission. The UE 115 may determine if the decoding process will fail during the decoding prediction periods 415 based on one or more decoding parameters associated with the downlink data message.

The base station 105 may receive the predicted NACK message and, in some cases, may determine to retransmit the downlink data message based on the one or more prediction metrics associated with the predicted NACK message, as described with reference to FIGS. 2 and 3. For example, the base station may determine that a threshold associated with the predicted NACK message satisfies a configured threshold for retransmissions, and the base station 105 may determine to retransmit the downlink data message accordingly. The base station 105 may transmit a control message via one or more resources allocated for a downlink control channel 430 to the UE 115 prior to retransmitting the downlink data message. The control message may indicate to the UE 115 that the downlink data message may be retransmitted at an earlier time. For example, the control message (e.g., control information transmitted via a PDCCH) may indicate one or more time or frequency resources over which the UE 115 may monitor for the downlink data message in a downlink data channel 435. In some examples, the first control message (e.g., the control message transmitted via the downlink control channel 430-*a*) may specify one or more resources for retransmissions of the downlink data message (e.g., a cycle period for downlink data message retransmissions via downlink data channels 435), and the base station 105 may or may not transmit a control message specifically scheduling each retransmission of the downlink data message.

The UE 115 may transmit a NACK or ACK for each corresponding downlink data message during each of the feedback opportunities 445. In some examples, the UE 115 may refrain from transmitting the predicted NACK message (e.g., the UE 115 may determine that the decoding process is likely to succeed or that the probability of failure fails to satisfy a threshold). Additionally or alternatively, the base station 105 may determine to ignore a predicted NACK message (e.g., a probability associated with the predicted NACK message may be below a threshold). In some such cases, the base station 105 may determine whether to retransmit the downlink data message based on whether an ACK or a NACK is received during a corresponding feedback opportunity 445. In some examples, the UE 115 may transmit a predicted NACK message during a predicted NACK occasion 440, and the UE 115 may subsequently transmit a feedback message (e.g., a HARQ message) indicating an ACK or NACK during a feedback opportunity 445.

In some examples, the transmission of both the predicted NACK message and the HARQ message indicating an ACK or NACK may improve the reliability of the communications between the base station 105 and the UE 115. In the example of FIG. 4, the UE 115 may refrain from transmitting a predicted NACK message during the predicted NACK occasion 440-*a* associated with the decoding prediction period 415-*a* (e.g., the UE 115 may determine that the probability the decoding process will fail is below a threshold). The UE 115 may subsequently finish decoding the remainder of the downlink data message during the data processing period 405-*a*, and the UE 115 may determine that the downlink data message may not have been received or decoded successfully. The UE 115 may transmit a NACK during the feedback opportunity 445-*a*. As such, the base station 105 may not receive a predicted NACK message, but the base station 105 may instead receive the NACK indication. The base station 105 may thereby decode the NACK and determine to retransmit the downlink data message during the retransmission processing period 410-*c*. The reliability of the predicted NACK messages may be improved based on the one or more prediction metrics configured at the UE 115 or the base station 105, a machine learning algorithm at the UE 115 or the base station 105, or a combination of these.

The predicted NACK transmissions may reduce a timeline associated with the retransmission of the downlink data message (e.g., the reduction in the timeline may be shown by the retransmission timing difference 420). In some examples, the base station 105 may retransmit the downlink data message a number of times before the UE 115 successfully receives and decodes the downlink data message. If the base station 105 receives a predicted NACK message for the downlink data message during a predicted NACK occasion 440, the base station 105 may potentially increase the number of times the downlink data message may be retransmitted within the communication timeline 400. For example, the predicted NACK message transmitted via predicted NACK occasion 440-*a* may enable the base station 105 to perform retransmission processing period 410-*a* and subsequently retransmit the downlink data message. The UE 115 may determine to transmit a second predicted NACK message for the retransmission of the downlink data message based on one or more prediction metrics indicated during decoding prediction period 415-*b*. The second predicted NACK message may enable the base station 105 to retransmit the downlink data message again after retransmission processing period 410-*b*. As such, in the example of FIG. 4, the base station 105 may retransmit the downlink data message two times within the communication timeline 400. In some examples, the UE 115 may refrain from transmitting the predicted NACK messages, and the base station 105 may transmit a single retransmission of the downlink data message at the downlink data retransmission occasion 425 based on a NACK indication received via feedback opportunity 445-*a*. The base station 105 may, however, retransmit the downlink data message any number of times, and the present examples are provided for illustrative purposes and should not be considered limiting.

As described herein, one or more predicted NACK messages may be transmitted by the UE 115 during the predicted NACK occasions 440, which may shorten the processing timelines associated with the retransmission of downlink data messages. The base station 105 may thereby shorten the retransmission cycle period approximately by a time shown by the retransmission timing difference 420 if the UE 115 transmits a predicted NACK message.

Figure 5:
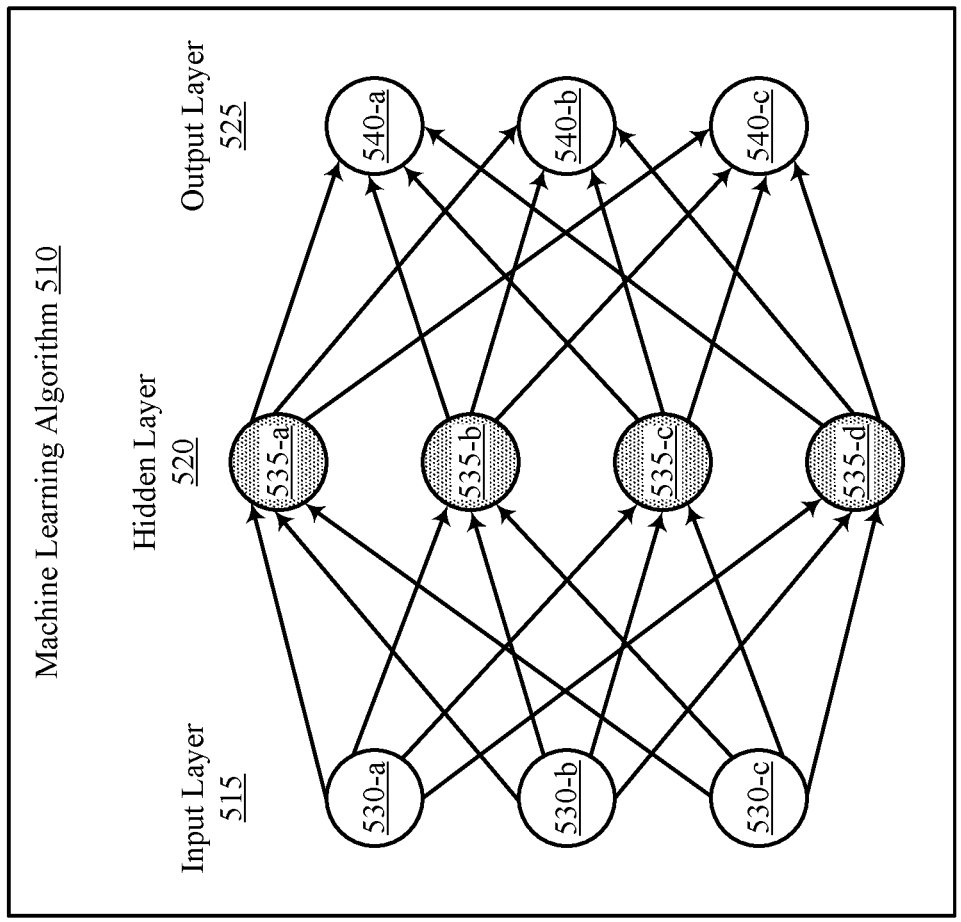
FIG. 5 illustrates an example of a machine learning process that supports early NACK indication for a data message in accordance with aspects of the present disclosure.

FIG. 5 illustrates an example of a machine learning process 500 that supports early NACK indication for a data message in accordance with aspects of the present disclosure. The machine learning process 500 may be implemented at a wireless device, such as a UE as described with reference to FIGS. 1-4. The machine learning process 500 may include a machine learning algorithm 510. In some examples, a UE may implement the machine learning algorithm 510 to improve early NACK predictions for the UE.

As described with reference to FIGS. 2 and 3, the machine learning process 500 may be implemented at a UE to enhance the prediction of failed decoding processes. In some examples, the UE may send input values 505 to the machine learning algorithm 510 for processing. The input values 505 may be values associated with a decoding process at the UE. For example, the input values 505 may be a number of channel measurements, LLR values, path metric values, previously-determined decoding predictions, a history of predicted NACK transmissions, a first NACK threshold associated with sending NACK transmissions, or a combination of these. In some examples, the UE may perform an iterative decoding process, such as a turbo decoding process or an LDPC decoding process. In such examples, the input values 505 may be intermediate parameters generated by the iterative decoding algorithm. The machine learning algorithm 510 may process the input values 505 and determine output values 545. In some examples, the output values 545 may correspond to a UE state. For example, an output value 545 may be a likelihood of decoding failure, a binary prediction of decoding failure, a cause of predicted decoding failure, a modified predicted NACK transmission capability, a modified decoding capability (e.g., a capability to predict that a decoding process may fail), or any combination thereof. Other potential outputs may include a reliability of one or more predicted NACK transmissions, a probability associated with the NACK transmissions, or any combination of these or other potential outputs.

In some examples, the machine learning algorithm 510 may be utilized to create a model for predicting whether a decoding process will fail or for predicting whether a predicted NACK message is reliable. For example, the machine learning algorithm 510 may determine whether to transmit a predicted NACK message based on early stages of a decoding process. For example, the machine learning algorithm 510 may track metrics (e.g., LLRs, path metrics, or both for a first set of decoding stages) of successful decoding processes, failed decoding processes, or both for downlink data messages. In some cases, a UE that performs an iterative decoding process may reduce iterations by utilizing the machine learning algorithm 510. For example, if an iterative algorithm includes n iterations and the UE inputs intermediate parameters generated by the iterative algorithm to the machine learning algorithm 510 prior to completion of the n iterations, the machine learning algorithm 510 may output a prediction of whether the decoding process will fail. For example, the UE may predict that the decoding process will fail if the output of the machine learning algorithm 510 satisfies a first NACK threshold associated with an incomplete decoding process. As such, the UE may predict an outcome of the decoding process in k iterations, where k may be less than n, such that the UE may terminate the decoding process, transmit a predicted NACK message, or both prior to completion of the n iterations. Additionally or alternatively, the machine learning algorithm 510 may track metrics related to SNR values, SINR values, RSRP values, RSRQ values, or a combination of these or other metrics for one or more DMRSs, SRSs, or both. Based on such metrics, the machine learning algorithm 510 may predict whether a decoding process is likely to fail.

As illustrated, the machine learning algorithm 510 may be an example of a neural net, such as a feed forward (FF) or deep feed forward (DFF) neural network, a recurrent neural network (RNN), a long/short term memory (LSTM) neural network, or any other type of neural network. However, any other machine learning algorithms may be supported by the UE. For example, the machine learning algorithm 510 may implement a nearest neighbor algorithm, a linear regression algorithm, a Naïve Bayes algorithm, a random forest algorithm, or any other machine learning algorithm. Further, the machine learning process 500 may involve supervised learning, unsupervised learning, semi-supervised learning, reinforcement learning, or any combination thereof. The machine learning may be performed prior to deployment of a UE, while the UE is deployed, during low usage periods of the UE while the UE is deployed, or any combination thereof. For example, the machine learning algorithm 510 may be trained prior to deployment of the UE. Additionally or alternatively, the UE may perform training of the machine learning algorithm 510 while the UE is online (e.g., continuous training, downtime training, or other online training).

The machine learning algorithm 510 may include an input layer 515, one or more hidden layers 520, and an output layer 525. In a fully connected neural network with one hidden layer 520, each hidden layer node 535 may receive a value from each input layer node 530 as input, where each input is weighted. These neural network weights may be based on a cost function that is revised during training of the machine learning algorithm 510. Similarly, each output layer node 540 may receive a value from each hidden layer node 535 as input, where the inputs are weighted. If post-deployment training (e.g., online training) is supported at a UE, the UE may allocate memory to store errors and/or gradients for reverse matrix multiplication. These errors and/or gradients may support updating the machine learning algorithm 510 based on output feedback. Training the machine learning algorithm 510 may support computation of the weights (e.g., connecting the input layer nodes 530 to the hidden layer nodes 535 and the hidden layer nodes 535 to the output layer nodes 540) to map an input pattern to a desired output outcome. This training may result in a UE-specific machine learning algorithm 510 based on the historic predicted NACK transmissions and decoding processes for a specific UE.

The UE may send input values 505 to the machine learning algorithm 510 for processing. The input values 505 may be converted into a set of k input layer nodes 530 at the input layer 515. In some cases, different measurements may be input at different input layer nodes 530 of the input layer 515. Some input layer nodes 530 may be assigned default values (e.g., values of 0) if the number of input layer nodes 530 exceeds the number of inputs corresponding to the input values 505. As illustrated, the input layer 515 may include three input layer nodes 530-a, 530-b, and 530-c. However, it is to be understood that the input layer 515 may include any number of input layer nodes 530 (e.g., 20 input nodes).

The machine learning algorithm 510 may convert the input layer 515 to a hidden layer 520 based on a number of input-to-hidden weights between the k input layer nodes 530 and the n hidden layer nodes 535. The machine learning algorithm 510 may include any number of hidden layers 520 as intermediate steps between the input layer 515 and the output layer 525. Additionally, each hidden layer 520 may include any number of nodes. For example, as illustrated, the hidden layer 520 may include four hidden layer nodes 535-*a*, 535-*b*, 535-*c*, and 535-*d*. However, it is to be understood that the hidden layer 520 may include any number of hidden layer nodes 535 (e.g., 10 hidden layer nodes). In a fully connected neural network, each node in a layer may be based on each node in the previous layer. For example, the value of hidden layer node 535-*a* may be based on the values of input layer nodes 530-*a*, 530-*b*, and 530-*c* (e.g., with different weights applied to each node value).

The machine learning algorithm 510 may determine values for the output layer nodes 540 of the output layer 525 following one or more hidden layers 520. For example, the machine learning algorithm 510 may convert the hidden layer 520 to the output layer 525 based on a number of hidden-to-output weights between the n hidden layer nodes 535 and the m output layer nodes 540. In some cases, n=m. Each output layer node 540 may correspond to a different output value 545 of the machine learning algorithm 510. As illustrated, the machine learning algorithm 510 may include three output layer nodes 540-*a*, 540-*b*, and 540-*c*, supporting three different output values. However, it is to be understood that the output layer 525 may include any number of output layer nodes 540 (e.g., 2 output nodes, corresponding to either the decoding process will fail, or the decoding process will succeed). The values determined by the machine learning algorithm 510 for the output layer nodes 540 may correspond to probabilities or other metrics that the UE or the base station may use to predict that a decoding process for a downlink data message will fail, determine a probability associated with the likelihood that the decoding process will fail, determine whether to transmit a predicted NACK message, determine whether a reliability associated with the predicted NACK message is above a retransmission threshold, or a combination thereof.

Figure 6:
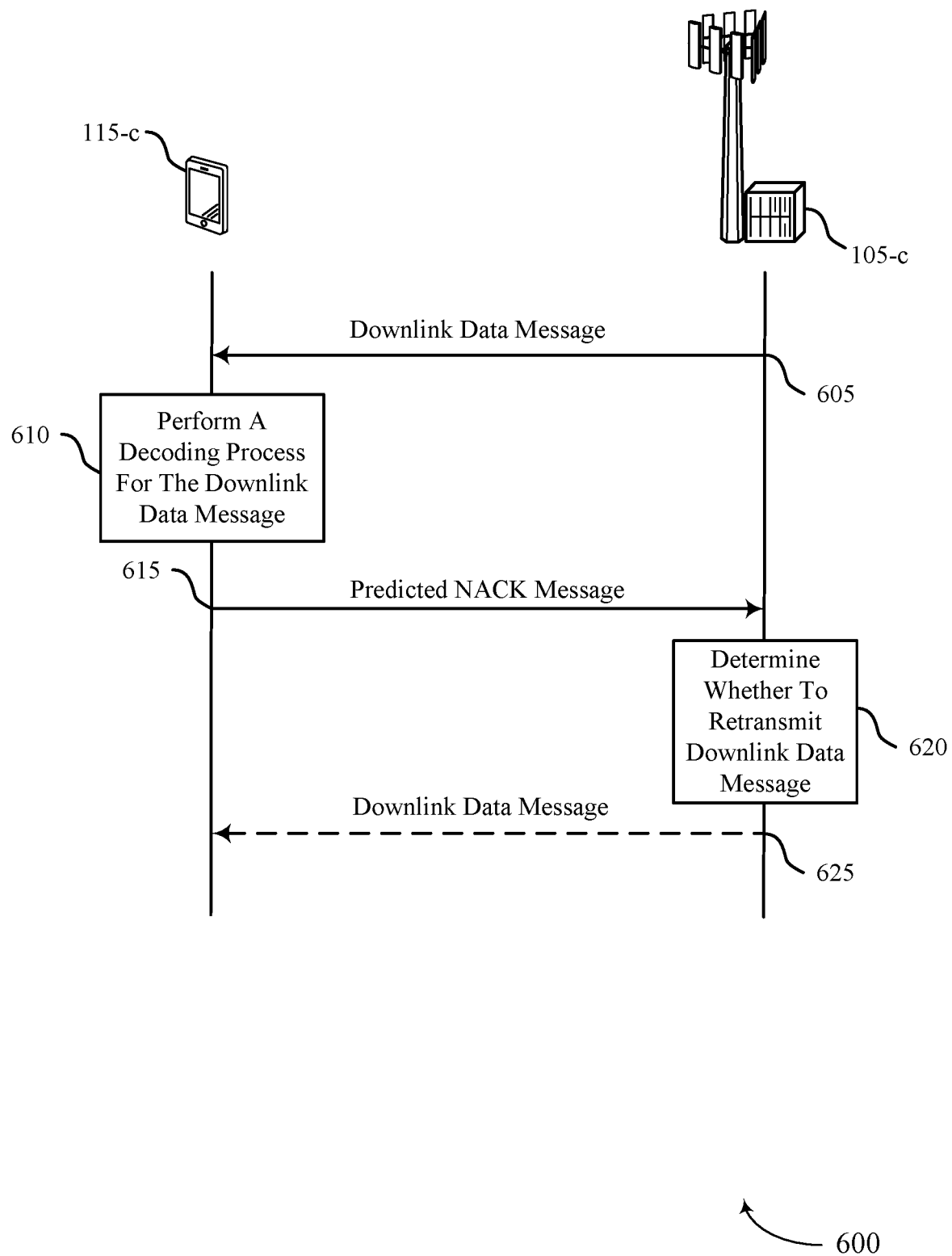
FIGS. 6 and 7 illustrate examples of process flows that support early NACK indication for a data message in accordance with aspects of the present disclosure.

FIG. 6 illustrates an example of a process flow 600 that supports early NACK indication for a data message in accordance with aspects of the present disclosure. In some examples, the process flow 600 may implement various aspects of the present disclosure described with reference to FIGS. 1-5. The process flow 600 may include UE 115-*c* and base station 105-*c*, which may be examples of a UE 115 and a base station 105 as described with reference to FIGS. 1-5. In some examples, UE 115-*c* may transmit one or more predicted NACK messages to base station 105-*c*, which may shorten a timeline associated with communications between base station 105-*c* and UE 115-*c*. Alternative examples of the following may be implemented, where some steps are performed in a different order then described or are not performed at all. In some cases, a step may include additional features not mentioned below, or further steps may be added.

At 605, base station 105-*c* may transmit a downlink data message to UE 115-*c*. The downlink data message may be transmitted as part of a communication connection with UE 115-*c*. For example, the downlink data message may be transmitted within a communication timeline. The downlink data message may include data for UE 115-*c* to decode. For example, UE 115-*c* may determine one or more LLRs for decoding the signal representing the downlink data. Additionally or alternatively, UE 115-*c* may receive a set of reference signals to support decoding the downlink data, such as one or more DMRSs received concurrent with the downlink data message.

At 610, UE 115-*c* may perform a decoding process for the downlink data message. UE 115-*c* may decode the downlink data message according to one or more decoding parameters. For example, UE 115-*c* may determine one or more SNR values, one or more SINR values, one or more RSRP values, one or more RSRQ values, or a combination of these for one or more DMRSs received concurrent with the downlink data message, one or more LLRs associated with decoding the downlink data message, one or more path metrics associated with decoding the downlink data message, or a combination of these. In some examples, UE 115-*c* may determine that the decoding process is likely to fail before decoding the full set of bits representing the downlink data message. For example, UE 115-*c* may determine that one or more of the decoding parameters listed above do not satisfy a first NACK threshold during an early stage of the decoding process. Additionally or alternatively, UE 115-*c* may determine that the decoding process is likely to fail based on a value for one or more path metrics for the first set of decoding stages failing to satisfy a first NACK threshold, an output of a machine learning algorithm at UE 115-*c* failing to satisfy a first NACK threshold, or a combination of these.

At 615, UE 115-*c* may transmit a predicted NACK message to base station 105-*c*. UE 115-*c* may transmit the predicted NACK message if UE 115-*c* determines that the decoding process is likely to fail (e.g., if UE 115-*c* determines that the probability that the decoding process will fail is above a first NACK threshold associated with an incomplete decoding process), if UE 115-*c* is configured with a capability to transmit predicted NACK messages, if UE 115-*c* has previously indicated the capability to base station 105-*c*, or a combination of these. In some examples, the predicted NACK message may be transmitted by UE 115-*c* concurrent to UE 115-*c* receiving at least a portion of the downlink data message, concurrent to at least a portion of the decoding process for the downlink data message, or both. Additionally or alternatively, UE 115-*c* may transmit the predicted NACK message via a dedicated resource (e.g., a dedicated mini-slot) for transmitting predicted NACK messages (e.g., if UE 115-*c* is configured for half-duplex communications). In some examples, an uplink resource for transmitting the predicted NACK message may be determined based on a first timeline for UE 115-*c* to predict whether the decoding process will fail. The uplink resource may be pre-configured and indicated to UE 115-*c*, base station 105-*c*, or both via one or more configuration messages, capability messages, or both.

At 620, base station 105-*c* may determine whether to retransmit the downlink data message. In some examples, base station 105-*c* may determine whether to retransmit the downlink data message based on one or more prediction metrics associated with the predicted NACK message received at 615. The prediction metrics may include an indication of the first NACK threshold used by UE 115-*c*, a level of confidence in the NACK prediction, a probability that the decoding process at UE 115-*c* will fail, one or more prediction metrics indicated by a machine learning process at UE 115-*c* or at base station 105-*c*, or a combination of these. One or more of the thresholds (e.g., one or more first NACK thresholds, one or more retransmission thresholds) for the prediction metrics may be indicated to UE 115-*c* via a configuration message transmitted by base station 105-*c*. For example, base station 105-*c* may configure a retransmission threshold for retransmission of the downlink data message (e.g., a threshold probability or reliability associated with the predicted NACK message), and base station 105-*c* may transmit an indication of the retransmission threshold to UE 115-*c* via a configuration message. As such, the predicted NACK message may include an indication of a value for the one or more prediction metrics. In the example of FIG. 6, at 620, base station 105-*c* may determine that a probability indicated via the predicted NACK message received at 615 satisfies the configured retransmission threshold (e.g., the probability that the predicted NACK message is correct may be greater than 50%), and base station 105-*c* may determine to retransmit the downlink data message accordingly. Additionally or alternatively, at 620, base station 105-*c* may determine whether to retransmit the downlink data message based on a machine learning algorithm at base station 105-*c* (e.g., based on an output of the machine learning algorithm satisfying a retransmission threshold).

In some examples, base station 105-*c* may determine whether to retransmit the downlink data message based on the predicted NACK message, an actual ACK or NACK indicated in a HARQ message, or both. For example, at 615, UE 115-*c* may transmit the predicted NACK message before the decoding process is finished. In some examples, UE 115-*c* may additionally complete the decoding process and UE 115-*c* may transmit an ACK or NACK during a configured feedback opportunity following the transmission of the predicted NACK message based on the completed decoding process (e.g., based on a second NACK threshold associated with the complete decoding process). If UE 115-*c* transmits a NACK indication during the feedback opportunity, base station 105-*c* may determine to retransmit the downlink data message accordingly. In some examples, base station 105-*c* may have previously determined to retransmit the downlink data message based on the predicted NACK message transmitted at 620, and the NACK message may confirm the determination. Additionally or alternatively, base station 105-*c* may have determined to ignore the predicted NACK message transmitted at 620 (e.g., a probability associated with the predicted NACK message may have been below a retransmission threshold value), or base station 105-*c* may not have received the predicted NACK message at 620. In such examples, if UE 115-*c* transmits a NACK indication in a feedback message (e.g., a HARQ message), base station 105-*c* may determine to retransmit the downlink data message according to the NACK indication.

At 625, in some examples, base station 105-*c* may retransmit the downlink data message. The downlink data message may be retransmitted based on the determination at 620. For example, the downlink data message may be retransmitted based on one or more of a predicted NACK message, a HARQ message indicating a NACK, or both. UE 115-*c* may receive the downlink data message, and UE 115-*c* may perform a decoding procedure on the downlink data message. In some examples, UE 115-*c* may successfully receive and decode the downlink data message. Additionally or alternatively, UE 115-*c* and base station 105-*c* may repeat the communication procedure described herein until UE 115-*c* successfully receives and decodes the downlink data message and transmits an ACK message, or until a timeline for the communications is complete.

Figure 7:
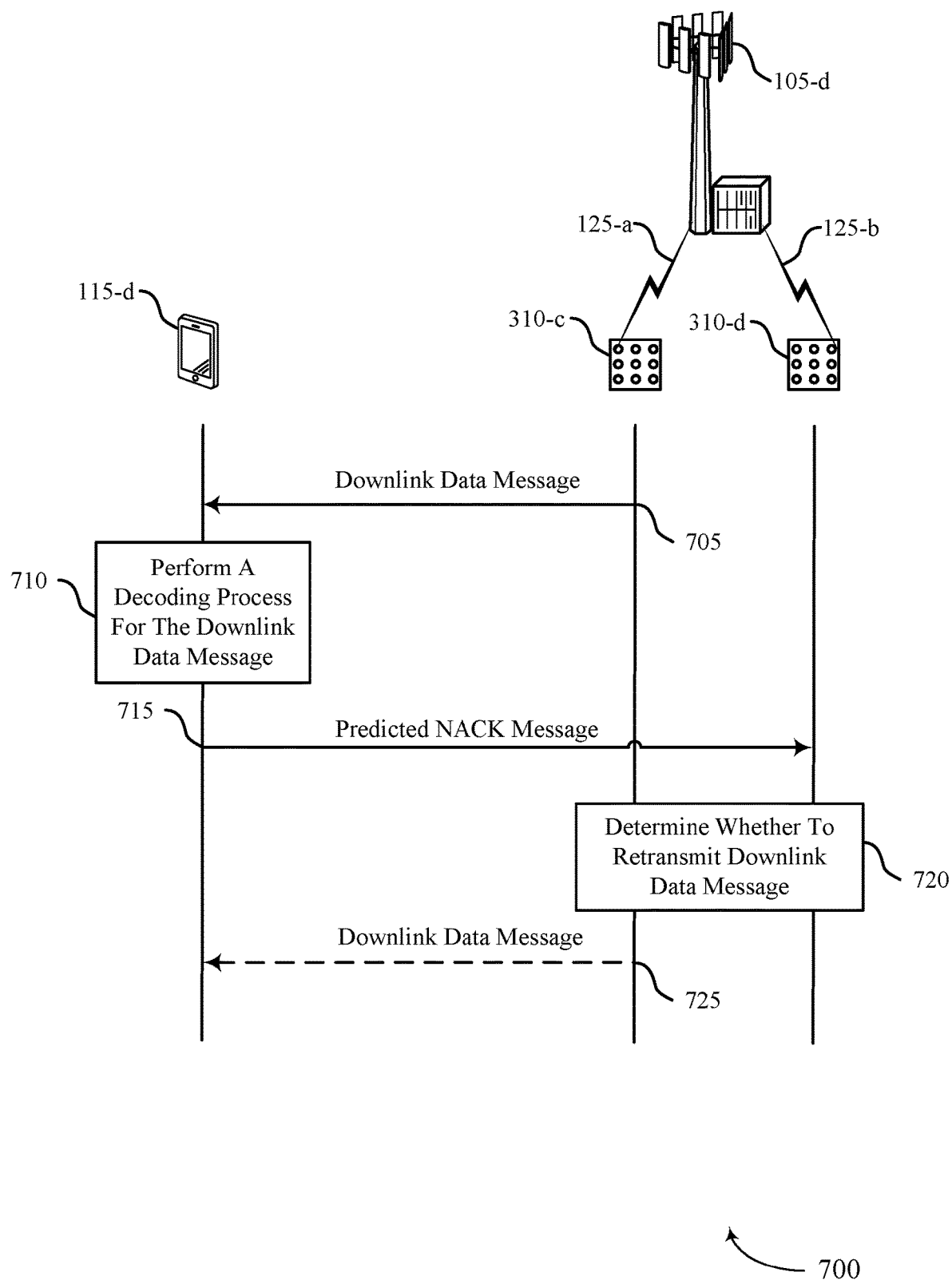

FIG. 7 illustrates an example of a process flow 700 that supports early NACK indication for a data message in accordance with aspects of the present disclosure. In some examples, the process flow 700 may implement aspects of a wireless communications system 100. The process flow 700 may include UE 115-*d* and base station 105-*d*, which may be examples of a UE 115 and a base station 105 as described with reference to FIGS. 1-6. Base station 105-*d* may include TRP 310-*c* and TRP 310-*d*. In some examples, UE 115-*d* may transmit one or more predicted NACK messages to base station 105-*d*, which may shorten a timeline associated with communications between base station 105-*d* and UE 115-*d*. In some examples, TRP 310-*c* and TRP 310-*d* may correspond to different base stations 105, rather than the same base station 105-*d*. TRP 310-*c* may communicate with base station 105-*d* using communication link 125-*a*, and TRP 310-*d* may communication with base station 105-*d* using communication link 125-*d*. Alternatively, TRP 310-*c* or TRP 310-*d* may communicate with a different base station 105, over a different communication link 125, and the different base station 105 and base station 105-*d* may communicate over a backhaul link. Communication links 125 may be examples of backhaul communication links, or other types of communication links. Alternative examples of the following may be implemented, where some steps are performed in a different order then described or are not performed at all. In some cases, a step may include additional features not mentioned below, or further steps may be added.

At 705, UE 115-*d* may receive a downlink data message from first TRP 310-*c* of base station 105-*d*. UE 115-*d* may receive the downlink data message according to a first beam configuration. At 710, UE 115-*d* may perform a decoding process for the downlink data message.

In some examples, UE 115-*d* may provide a set of decoding parameters of the decoding process for the downlink data message to a machine learning algorithm, where the decoding process for the downlink data message may be predicted to fail based on an output of the machine learning algorithm (e.g., based on the output satisfying a first NACK threshold). For example, the output of the machine learning algorithm may indicate that the decoding process is predicted to fail, indicate a probability that the decoding process for the downlink data message will fail, or indicate a combination of these. In some cases, UE 115-*d* may label a set of decoding processes for a set of downlink data messages according to whether each decoding process of the set of decoding processes fails. UE 115-*d* may train the machine learning algorithm using the set of decoding processes and the set of decoding parameters of the labeled set of decoding processes.

UE 115-*d* may generate a predicted NACK message, where the generating may be initiated prior to completion of the decoding process for the downlink data message. The predicted NACK message may include an indication of a cause for the decoding process for the downlink data message to be predicted to fail, a prediction metric indicating an estimated likelihood of the decoding process failing for the downlink data message, or a combination of these. UE 115-*d* may transmit the predicted NACK at 715 based on the generating. Completion of the decoding process may involve the decoding process succeeding for the downlink data message, the decoding process failing for the downlink data message, an early termination of the decoding process for the downlink data message, or a combination of these.

UE 115-*d* may determine that the decoding process for the downlink data message is predicted to fail, where the predicted NACK message is transmitted at 715 based on the decoding process for the downlink data message being predicted to fail. The decoding process for the downlink data message may be predicted to fail based on one or more SNR values, one or more SINR values, one or more RSRP values, one or more RSRQ values, or a combination of these, for one or more DMRSs received with the downlink data message, one or more LLRs for a first set of decoding states of a set of decoding stages for the decoding process, one or more path metrics for the first set of decoding stages of the set of decoding stages for the decoding process, or a combination of these. UE 115-*d* may compare one or more of these values to one or more first NACK thresholds associated with an incomplete decoding process to determine whether to transmit a predicted NACK message.

UE 115-*d* may complete the decoding process for the downlink data message and may transmit, in the feedback opportunity, a feedback message including an ACK or NACK indication for the downlink data message based on the result of the decoding process (e.g., based on a second NACK threshold associated with the complete decoding process, the second NACK threshold associated with including a NACK indication in a HARQ feedback message). In some examples, the result of the decoding process may include a successful decoding result, the ACK message may indicate a positive ACK for the downlink data message, and UE 115-*d* may update a machine learning algorithm for determining to transmit the predicted NACK message based on transmitting the predicted NACK message and the result of the decoding process, including the successful decoding result.

At 715, UE 115-*d* may transmit, to second TRP 310-*d* of base station 105-*d*, and prior to a feedback opportunity for a result of the decoding process for the downlink data message to be transmitted to first TRP 310-*c*, a predicted NACK message for the downlink data message based on a first part of the decoding process. The predicted NACK may be based on a first NACK threshold associated with an incomplete decoding process, the first NACK threshold being different from a second NACK threshold associated with a complete decoding process. For example, UE 115-*d* may generate and transmit the predicted NACK message based on a value associated with the incomplete decoding process satisfying the first NACK threshold. Additionally or alternatively, the predicted NACK message may include information indicating the first NACK threshold used to trigger the predicted NACK transmission. UE 115-*d* may transmit the predicted NACK according to a second beam configuration. In some cases, UE 115-*d* may receive the downlink data message from TRP 310-*c* within a time period and may transmit the predicted NACK message to the second TRP 310-*d* in a time period prior to an end of the time period. In some cases, UE 115-*d* may receive the downlink data message from TRP 310-*c* in a first time period of contiguous time periods allocated for downlink signaling, and UE 115-*d* may transmit the predicted NACK to second TRP 310-*d* in a second time period of the set of contiguous time periods.

UE 115-*d* may determine a first uplink resource for transmitting the predicted NACK based on a first processing timeline value and a starting symbol for receiving the downlink data message (at 705), and UE 115-*d* may determine the feedback opportunity for transmitting the ACK message subsequent to the first uplink resource based on a second processing timeline value and an ending symbol for receiving the downlink data message. In some cases, UE 115-*d* may operating in a half-duplex mode, where the first uplink resources may include a dedicated uplink resource for transmitting, to the second TRP 310-*d*, the predicted NACK message TDDed with a set of downlink resources in a time period.

In some cases, UE 115-*d* may transmit a UE capability message indicating support of UE 115-*d* for transmitting the predicted NACK message, a processing timeline value for UE 115-*d* to transmit the predicted NACK, or a combination of these. Base station 105-*d* may monitor for the indication of the predicted NACK message from the second TRP 310-*d* based on the UE capability message, where the indication of the predicted NACK message may be received based on the monitoring. UE 115-*d* may transmit the predicted NACK message based on the UE capability message.

In some cases, UE 115-*d* may receive a configuration message indicating a timing for transmitting the predicted NACK message to second TRP 310-*d*, a retransmission threshold for retransmission at the first TRP 310-*c* based on a prediction metric of the predicted NACK message, a retransmission threshold for retransmission at the second TRP 310-*d*, or a combination of these. UE 115-*d* may transmit the predicted NACK based on the configuration message.

At 720, base station 105-*d* may determine to transmit a retransmission of the downlink data message based on the predicted NACK message received at 715. In some examples, base station 105-*d* may determine that a prediction metric indicated by the predicted NACK message satisfies a retransmission threshold for retransmission, where the prediction metric indicates an estimated likelihood of the decoding process for the downlink data message failing at UE 115-*d*.

Base station 105-*d* may update one or more decoding prediction statistics for UE 115-*d* based on a comparison of the predicted NACK message and the ACK message, where base station 105-*d* may determine to transmit the retransmission of the downlink data message based on the one or more decoding prediction statistics for UE 115-*d*.

At 725, UE 115-*d* may receive, from TRP 310-*c*, a retransmission of the downlink data message based on the predicted NACK that UE 115-*d* transmitted at 715.

In some cases, UE 115-*d* may determine a prediction metric for decoding the downlink data message, where the prediction metric indicates an estimated likelihood of the decoding process failing for the downlink data message. UE 115-*d* may determine that the prediction metric fails to satisfy a retransmission threshold for retransmission at the first TRP 310-*c*. In some cases, UE 115-*d* may refrain from monitoring for a retransmission of the downlink data message in response to the predicted NACK based on the prediction metric failing to satisfy the retransmission threshold for retransmission at the first TRP 310-*c*.

In some cases, base station 105-*d* may transmit, to another UE 115, an additional downlink data message. Base station 105-*d* may receive, from the additional UE 115, and prior to an additional feedback opportunity or a result of an additional decoding process for the additional downlink data message at the addition UE 115, an additional predicted NACK message for the additional downlink data message. Base station 105-*d* may determine that an additional prediction metric indicated by the additional predicted NACK message fails to satisfy the retransmission threshold for retransmission. Base station 105-*d* may then refrain from transmitting a retransmission of the additional downlink data message in response to the additional predicted NACK message based on the additional prediction metric failing to satisfy the retransmission threshold for retransmission.

Figure 8:
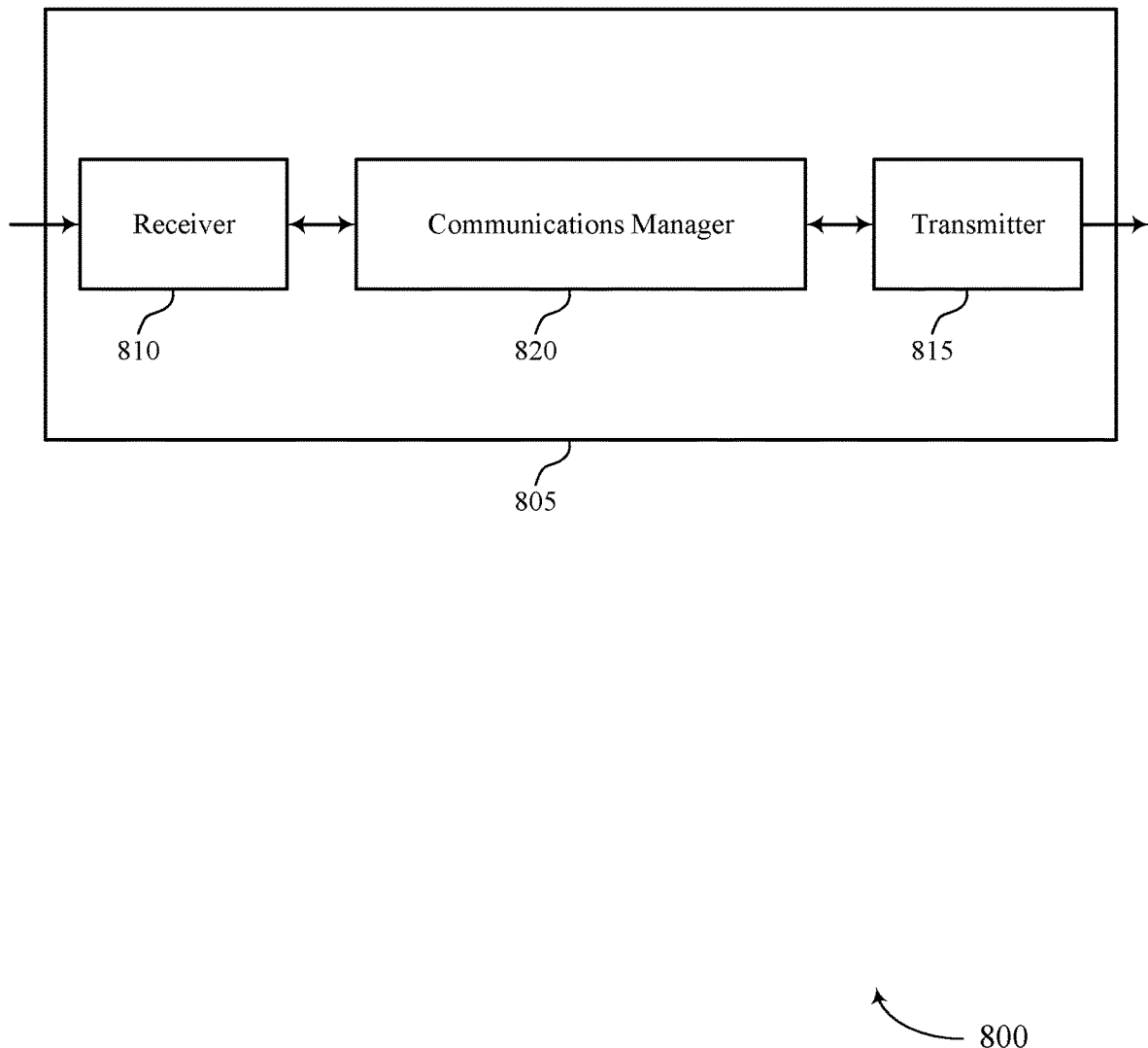
FIGS. 8 and 9 show block diagrams of devices that support early NACK indication for a data message in accordance with aspects of the present disclosure.

FIG. 8 shows a block diagram 800 of a device 805 that supports early NACK indication for a data message in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to early NACK indication for a data message). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to early NACK indication for a data message). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of early NACK indication for a data message as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving a downlink data message from a base station. The communications manager 820 may be configured as or otherwise support a means for performing a decoding process for the downlink data message. The communications manager 820 may be configured as or otherwise support a means for transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process.

Transmitting a predicted NACK message may reduce latency associated with the retransmission of a downlink data message. For example, the predicted NACK message may allow for a base station to determine to retransmit the downlink data message earlier (e.g., as compared to a determination based on a NACK indication in a scheduled HARQ opportunity), thereby potentially allowing for more retransmissions during a communication timeline. Additionally or alternatively, the predicted NACK message may improve a reliability of the communications. For example, the predicted NACK message may be transmitted with an associated level of confidence (e.g., the probability that the predicted NACK message is correct), and the level of confidence may be used to determine whether the base station should ignore the predicted NACK message. In one example, if the predicted NACK message is transmitted with a relatively low level of confidence, an ACK or NACK message may be subsequently transmitted by the UE to improve the reliability of the predicted NACK message.

Based on modifying the timeline for transmitting a NACK message, a processor of the device 805 (e.g., a processor controlling the receiver 810, the communications manager 820, the transmitter 815, or a combination thereof) may reduce processing resources used for receiving and decoding a downlink data message. For example, by predicting if a decoding process will fail during the early stages of decoding, the device 805 (e.g., a UE 115) may reduce the processing overhead associated with decoding a downlink data message (e.g., if the UE 115 implements early termination with the predicted NACK). Additionally or alternatively, by transmitting an early indication of a NACK, the device 805 (e.g., a UE 115) allows for more efficient use of resources for decoding the downlink data message. For example, the predicted NACK message may allow for more retransmissions of the downlink data within a configured communications timeline, thereby allowing for more opportunities for the device to decode the message reliably and efficiently. In another example, by transmitting predicted NACK messages, the device 805 may improve performance of a latency sensitive service (e.g., by receiving and decoding a downlink data message effectively) and improve user experience.

Figure 9:
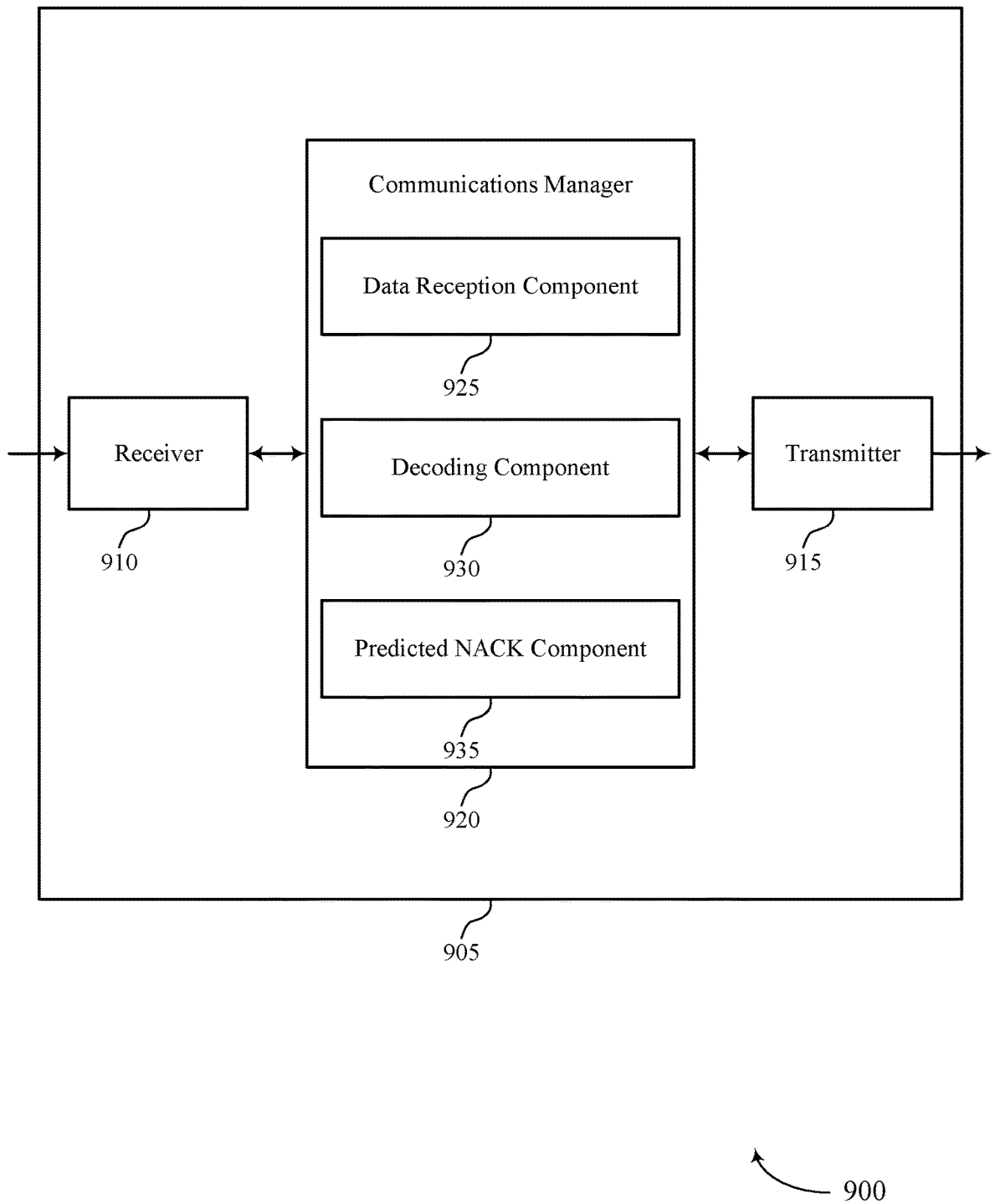

FIG. 9 shows a block diagram 900 of a device 905 that supports early NACK indication for a data message in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to early NACK indication for a data message). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to early NACK indication for a data message). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of early NACK indication for a data message as described herein. For example, the communications manager 920 may include a data reception component 925, a decoding component 930, a predicted NACK component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The data reception component 925 may be configured as or otherwise support a means for receiving a downlink data message from a base station. The decoding component 930 may be configured as or otherwise support a means for performing a decoding process for the downlink data message. The predicted NACK component 935 may be configured as or otherwise support a means for transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process.

Figure 10:
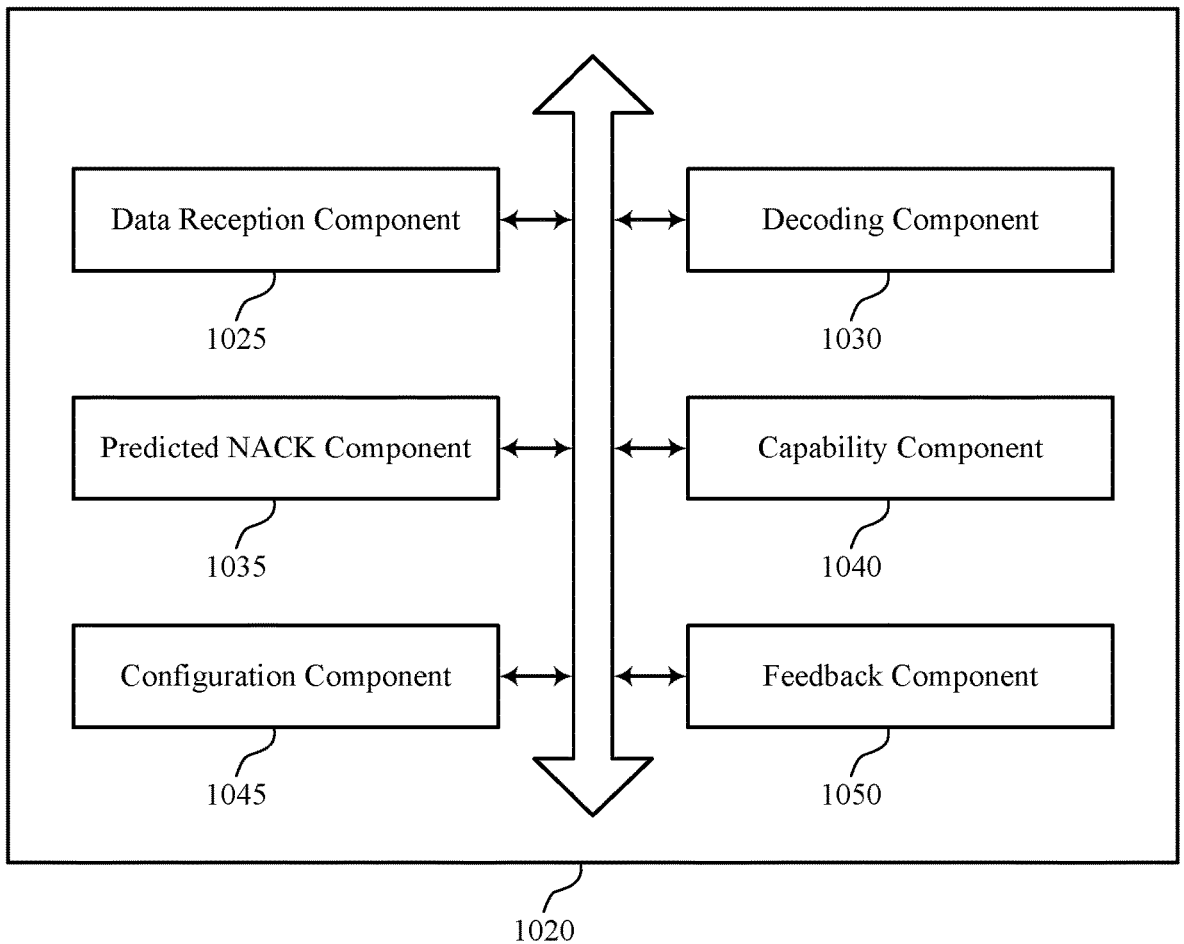
FIG. 10 shows a block diagram of a communications manager that supports early NACK indication for a data message in accordance with aspects of the present disclosure.

FIG. 10 shows a block diagram 1000 of a communications manager 1020 that supports early NACK indication for a data message in accordance with aspects of the present disclosure. The communications manager 1020 may be an example of aspects of a communications manager 820, a communications manager 920, or both, as described herein. The communications manager 1020, or various components thereof, may be an example of means for performing various aspects of early NACK indication for a data message as described herein. For example, the communications manager 1020 may include a data reception component 1025, a decoding component 1030, a predicted NACK component 1035, a capability component 1040, a configuration component 1045, a feedback component 1050, or any combination thereof. Each of these components may communicate, directly or indirectly, with one another (e.g., via one or more buses).

The communications manager 1020 may support wireless communications at a UE in accordance with examples as disclosed herein. The data reception component 1025 may be configured as or otherwise support a means for receiving a downlink data message from a base station. The decoding component 1030 may be configured as or otherwise support a means for performing a decoding process for the downlink data message. The predicted NACK component 1035 may be configured as or otherwise support a means for transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process.

In some examples, receiving the downlink data message includes receiving the downlink data message from a first TRP of the base station. In some examples, transmitting the predicted NACK message includes transmitting the predicted NACK message to a second TRP of the base station.

In some examples, the downlink data message is received from the first TRP according to a first beam configuration. In some examples, the predicted NACK message is transmitted to the second TRP according to a second beam configuration.

In some examples, the data reception component 1025 may be configured as or otherwise support a means for receiving, from the base station, a retransmission of the downlink data message based on the predicted NACK message.

In some examples, the decoding component 1030 may be configured as or otherwise support a means for determining a prediction metric for decoding the downlink data message, where the prediction metric indicates an estimated likelihood of the decoding process failing for the downlink data message. In some examples, the decoding component 1030 may be configured as or otherwise support a means for determining that the prediction metric fails to satisfy a retransmission threshold for retransmission at the base station. In some examples, the data reception component 1025 may be configured as or otherwise support a means for refraining from monitoring for a retransmission of the downlink data message in response to the predicted NACK message based on the prediction metric failing to satisfy the retransmission threshold for retransmission at the base station.

In some examples, the capability component 1040 may be configured as or otherwise support a means for transmitting, to the base station, a UE capability message indicating support for transmitting the predicted NACK message, a processing timeline value for the UE to transmit the predicted NACK message, or a combination thereof, where the predicted NACK message is transmitted based on the UE capability message.

In some examples, the configuration component 1045 may be configured as or otherwise support a means for receiving, from the base station, a configuration message indicating a timing for transmitting the predicted NACK message, one or more retransmission thresholds for retransmission at one or more TRPs of the base station based on a prediction metric of the predicted NACK message, or a combination thereof, where the predicted NACK message is transmitted based on the configuration message.

In some examples, the predicted NACK component 1035 may be configured as or otherwise support a means for generating the predicted NACK message, where the generating is initiated prior to completion of the decoding process for the downlink data message and the predicted NACK message includes an indication of a cause for the decoding process for the downlink data message to be predicted to fail, a prediction metric indicating an estimated likelihood of the decoding process failing for the downlink data message, or a combination thereof, and where the predicted NACK message is transmitted based on the generating.

In some examples, the predicted NACK component 1035 may be configured as or otherwise support a means for determining that the decoding process for the downlink data message is predicted to fail based on one or more SNR values, one or more SINR values, one or more RSRP values, one or more RSRQ values, or a combination thereof for one or more DMRSs received with the downlink data message, one or more LLRs for a first set of decoding stages of a set of multiple decoding stages for the decoding process, one or more path metrics for the first set of decoding stages of the set of multiple decoding stages for the decoding process, or a combination thereof, where the predicted NACK message is transmitted based on the decoding process for the downlink data message being predicted to fail.

In some examples, the decoding component 1030 may be configured as or otherwise support a means for completing the decoding process for the downlink data message. In some examples, the feedback component 1050 may be configured as or otherwise support a means for transmitting, to the base station and in the feedback opportunity, a feedback message including a positive acknowledgment or a NACK for the downlink data message based on the result of the decoding process.

In some examples, the predicted NACK component 1035 may be configured as or otherwise support a means for determining a first uplink resource for transmitting the predicted NACK message based on a first processing timeline value and a starting symbol for receiving the downlink data message. In some examples, the feedback component 1050 may be configured as or otherwise support a means for determining the feedback opportunity for transmitting the feedback message subsequent to the first uplink resource based on a second processing timeline value and an ending symbol for receiving the downlink data message.

In some examples, the predicted NACK component 1035 may be configured as or otherwise support a means for operating in a half-duplex mode, where the first uplink resource includes a dedicated uplink resource for transmitting the predicted NACK message time-division duplexed with a set of multiple downlink resources in a time period.

In some examples, the downlink data message is received in a time period. In some examples, the predicted NACK message is transmitted in the time period prior to an end of the time period.

In some examples, the downlink data message is received in a first time period of a set of multiple contiguous time periods allocated for downlink signaling. In some examples, the predicted NACK message is transmitted in a second time period of the set of multiple contiguous time periods prior to at least a portion of the set of multiple contiguous time periods.

Figure 11:
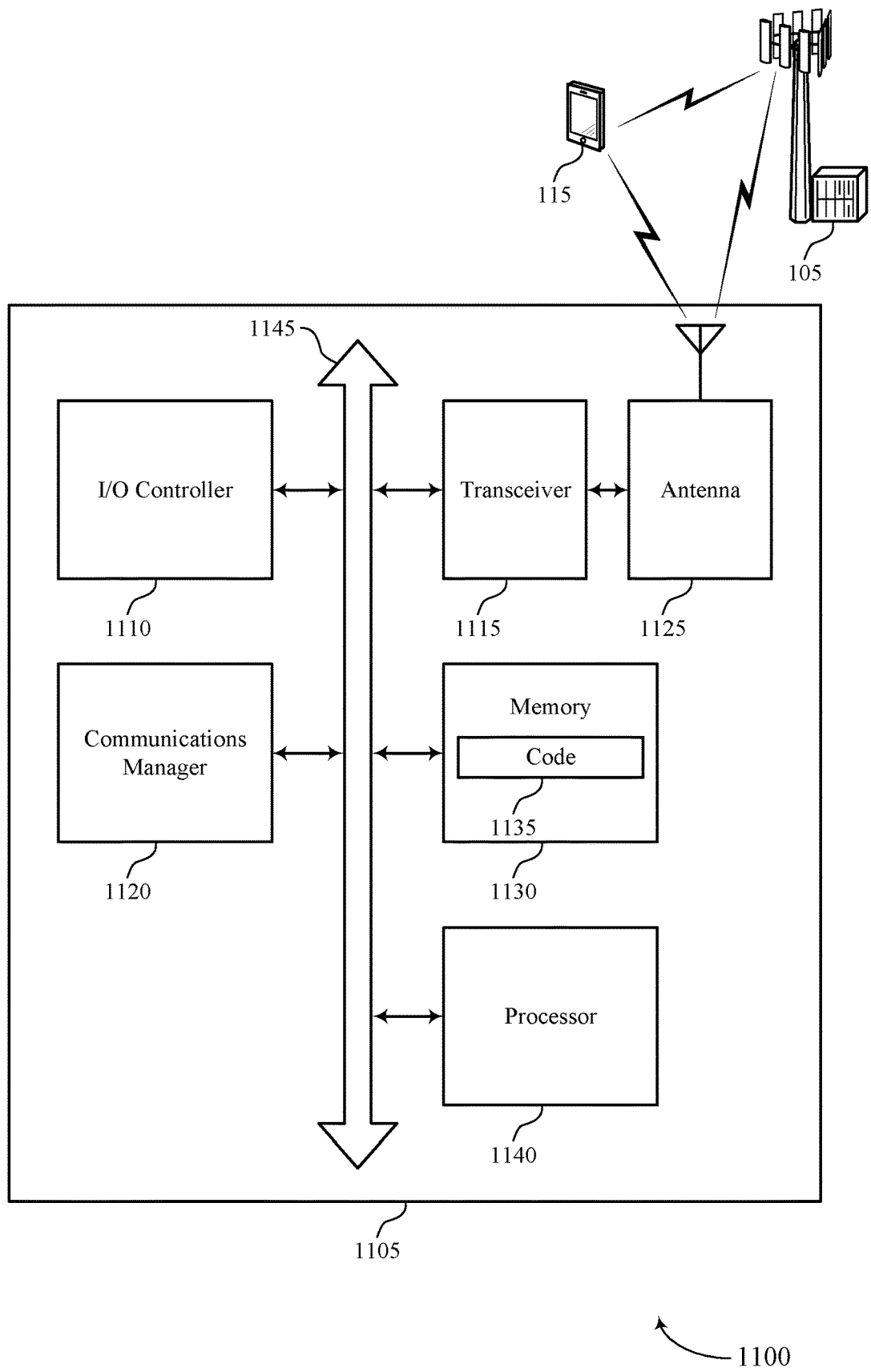
FIG. 11 shows a diagram of a system including a device that supports early NACK indication for a data message in accordance with aspects of the present disclosure.

FIG. 11 shows a diagram of a system 1100 including a device 1105 that supports early NACK indication for a data message in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting early NACK indication for a data message). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving a downlink data message from a base station. The communications manager 1120 may be configured as or otherwise support a means for performing a decoding process for the downlink data message. The communications manager 1120 may be configured as or otherwise support a means for transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of early NACK indication for a data message as described herein, or the processor 1140 and the memory 1130 may be otherwise configured to perform or support such operations.

Figure 12:
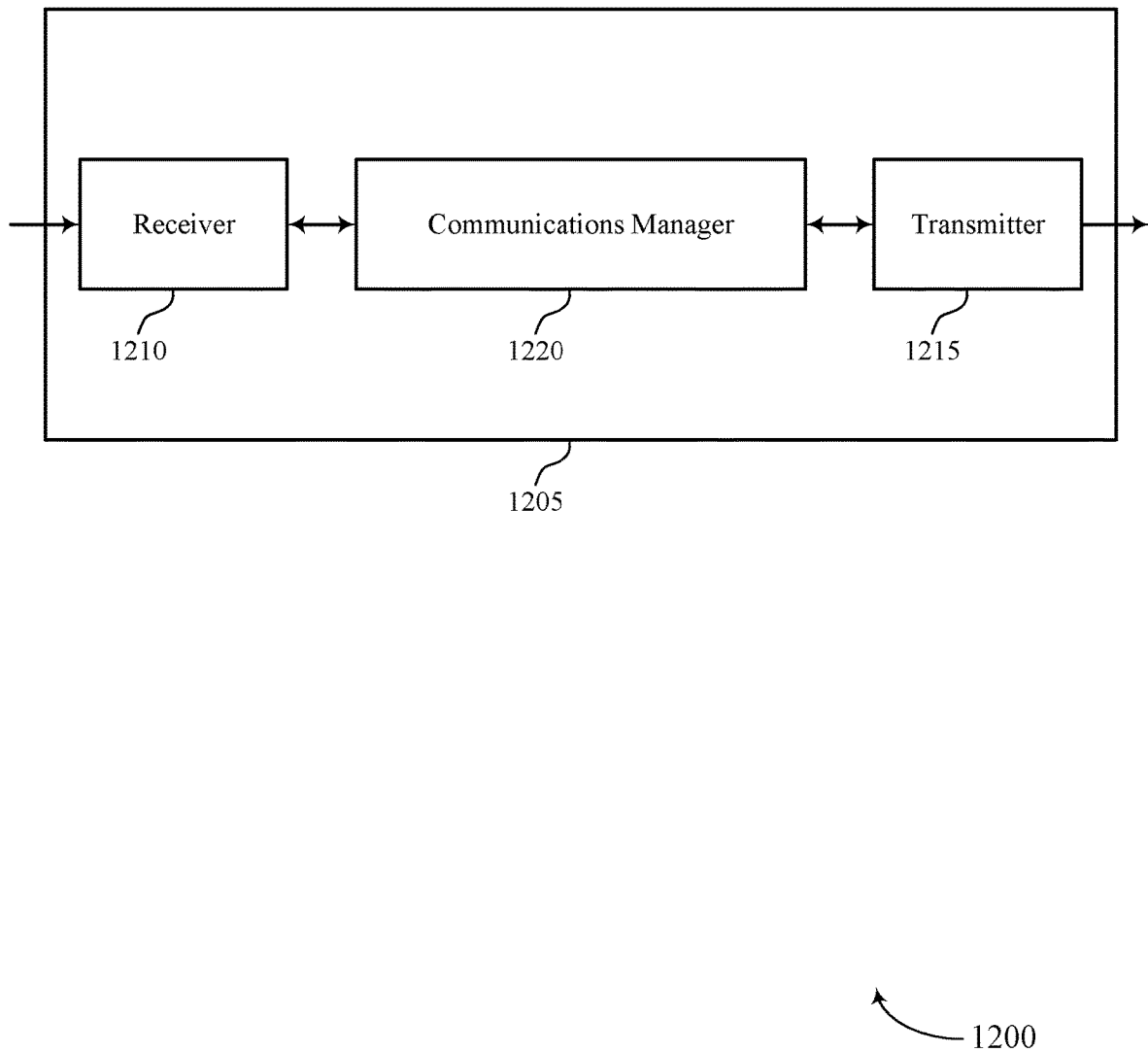
FIGS. 12 and 13 show block diagrams of devices that support early NACK indication for a data message in accordance with aspects of the present disclosure.

FIG. 12 shows a block diagram 1200 of a device 1205 that supports early NACK indication for a data message in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to early NACK indication for a data message). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to early NACK indication for a data message). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of early NACK indication for a data message as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting a downlink data message to a UE. The communications manager 1220 may be configured as or otherwise support a means for receiving, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process. The communications manager 1220 may be configured as or otherwise support a means for transmitting, to the UE, a retransmission of the downlink data message based on the predicted NACK message.

Figure 13:
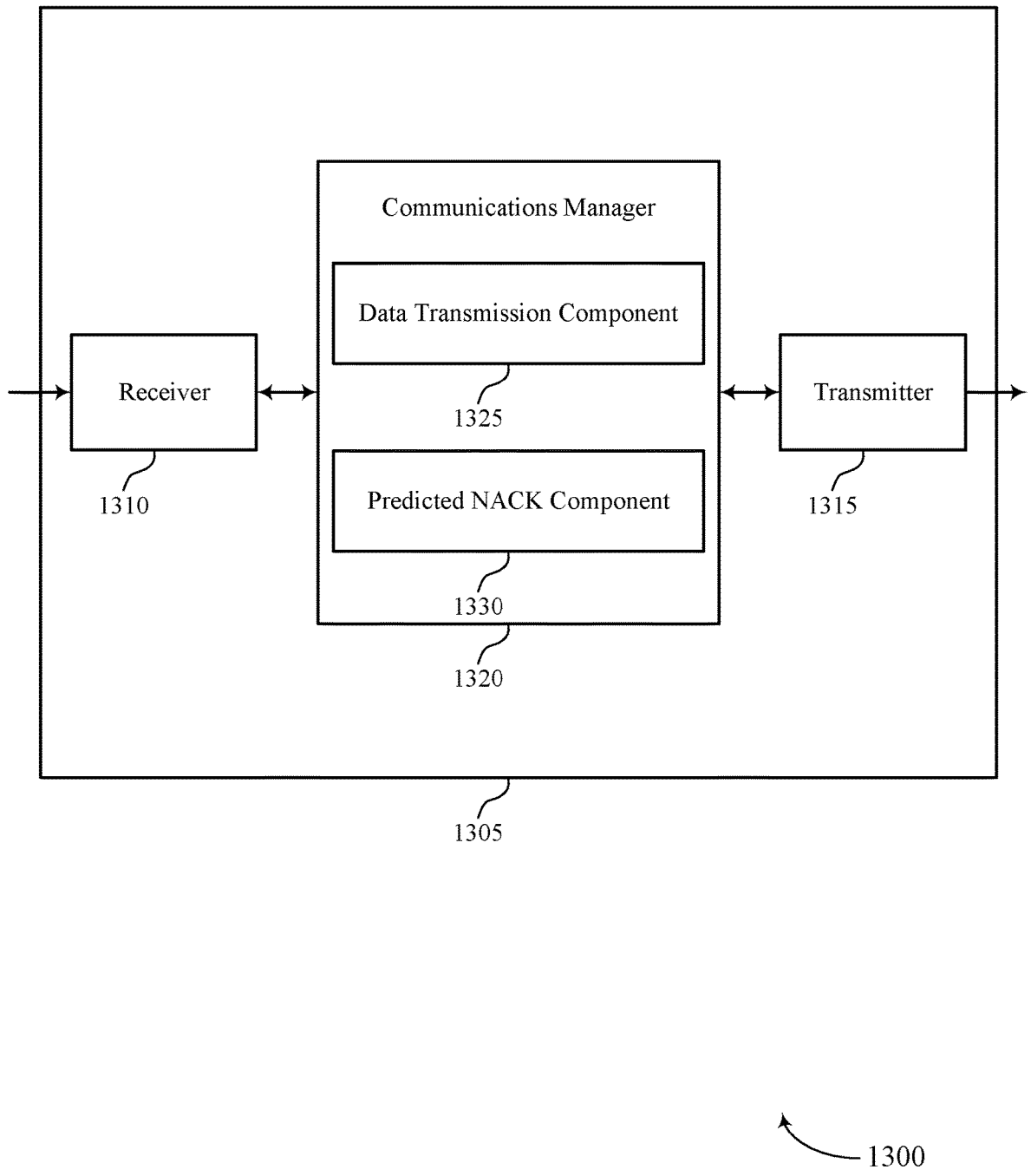

FIG. 13 shows a block diagram 1300 of a device 1305 that supports early NACK indication for a data message in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to early NACK indication for a data message). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to early NACK indication for a data message). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of early NACK indication for a data message as described herein. For example, the communications manager 1320 may include a data transmission component 1325 a predicted NACK component 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The data transmission component 1325 may be configured as or otherwise support a means for transmitting a downlink data message to a UE. The predicted NACK component 1330 may be configured as or otherwise support a means for receiving, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process. The data transmission component 1325 may be configured as or otherwise support a means for transmitting, to the UE, a retransmission of the downlink data message based on the predicted NACK message.

Figure 14:
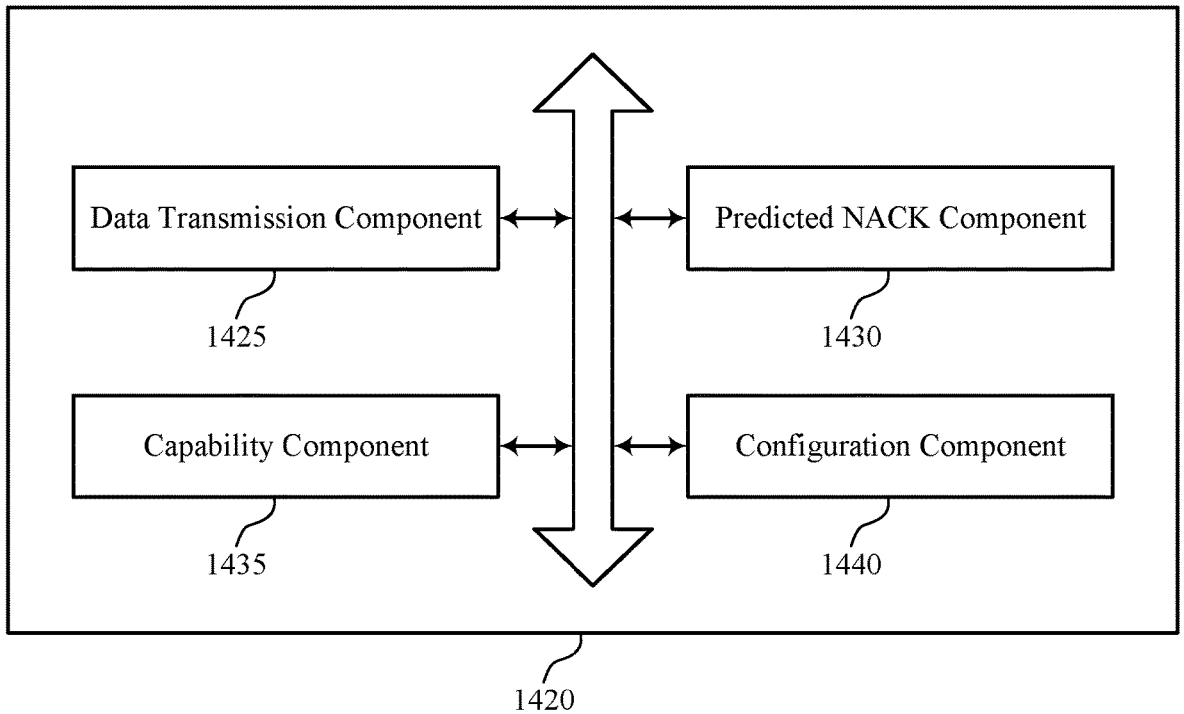
FIG. 14 shows a block diagram of a communications manager that supports early NACK indication for a data message in accordance with aspects of the present disclosure.

FIG. 14 shows a block diagram 1400 of a communications manager 1420 that supports early NACK indication for a data message in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of early NACK indication for a data message as described herein. For example, the communications manager 1420 may include a data transmission component 1425, a predicted NACK component 1430, a capability component 1435, a configuration component 1440, or any combination thereof. Each of these components may communicate, directly or indirectly, with one another (e.g., via one or more buses).

The communications manager 1420 may support wireless communications at a base station in accordance with examples as disclosed herein. The data transmission component 1425 may be configured as or otherwise support a means for transmitting a downlink data message to a UE. The predicted NACK component 1430 may be configured as or otherwise support a means for receiving, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process. In some examples, the data transmission component 1425 may be configured as or otherwise support a means for transmitting, to the UE, a retransmission of the downlink data message based on the predicted NACK message.

In some examples, transmitting the downlink data message includes transmitting the downlink data message via a first TRP of the base station. In some examples, receiving the predicted NACK message includes receiving the predicted NACK message via a second TRP of the base station.

In some examples, the downlink data message is transmitted via the first TRP according to a first beam configuration. In some examples, the predicted NACK message is received via the second TRP according to a second beam configuration.

In some examples, the data transmission component 1425 may be configured as or otherwise support a means for determining that a prediction metric indicated by the predicted NACK message satisfies a retransmission threshold, where the prediction metric indicates an estimated likelihood of the decoding process for the downlink data message failing at the UE, and where transmitting the retransmission of the downlink data message is further based on determining that the prediction metric satisfies the retransmission threshold.

In some examples, the data transmission component 1425 may be configured as or otherwise support a means for transmitting, to an additional UE, an additional downlink data message. In some examples, the predicted NACK component 1430 may be configured as or otherwise support a means for receiving, from the additional UE and prior to an additional feedback opportunity for a result of an additional decoding process for the additional downlink data message at the additional UE, an additional predicted NACK message for the additional downlink data message. In some examples, the predicted NACK component 1430 may be configured as or otherwise support a means for determining that an additional prediction metric indicated by the additional predicted NACK message fails to satisfy the retransmission threshold. In some examples, the data transmission component 1425 may be configured as or otherwise support a means for refraining from transmitting a retransmission of the additional downlink data message in response to the additional predicted NACK message based on the additional prediction metric failing to satisfy the retransmission threshold.

In some examples, the capability component 1435 may be configured as or otherwise support a means for receiving, from the UE, a UE capability message indicating support for transmitting the predicted NACK message, a processing timeline value for the UE to transmit the predicted NACK message, or a combination thereof. In some examples, the predicted NACK component 1430 may be configured as or otherwise support a means for monitoring for the predicted NACK message based on the UE capability message, where the predicted NACK message is received based on the monitoring.

In some examples, the configuration component 1440 may be configured as or otherwise support a means for transmitting, to the UE, a configuration message indicating a timing for the UE to transmit the predicted NACK message, one or more retransmission thresholds for retransmission at one or more TRPs of the base station based on a prediction metric of the predicted NACK message, or a combination thereof, where the predicted NACK message is received based on the configuration message.

In some examples, the predicted NACK message includes an indication of a cause for the decoding process for the downlink data message at the UE to be predicted to fail, a prediction metric indicating an estimated likelihood of the decoding process for the downlink data message to fail, or a combination thereof.

In some examples, the downlink data message is transmitted in a time period. In some examples, the predicted NACK message is received in the time period prior to an end of the time period.

In some examples, the downlink data message is transmitted in a first time period of a set of multiple contiguous time periods allocated for downlink signaling. In some examples, the predicted NACK message is received in a second time period of the set of multiple contiguous time periods prior to at least a portion of the set of multiple contiguous time periods.

Figure 15:
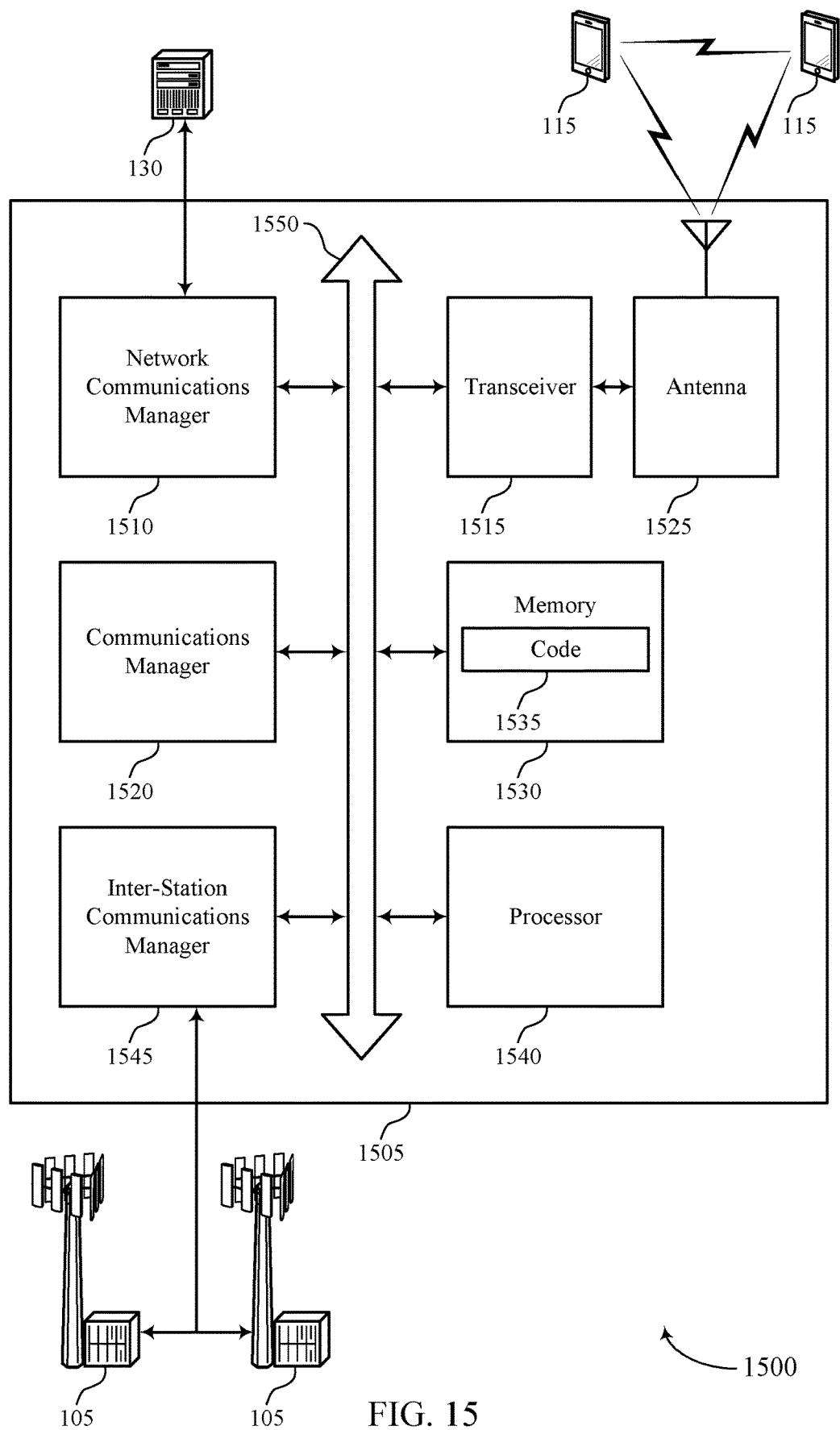
FIG. 15 shows a diagram of a system including a device that supports early NACK indication for a data message in accordance with aspects of the present disclosure.

FIG. 15 shows a diagram of a system 1500 including a device 1505 that supports early NACK indication for a data message in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting early NACK indication for a data message). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting a downlink data message to a UE. The communications manager 1520 may be configured as or otherwise support a means for receiving, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process. The communications manager 1520 may be configured as or otherwise support a means for transmitting, to the UE, a retransmission of the downlink data message based on the predicted NACK message.

In some examples, the communications manager 1520 may be configured to perform various operations (e.g., receiving, monitoring, transmitting) using or otherwise in cooperation with the transceiver 1515, the one or more antennas 1525, or any combination thereof. For example, the communications manager 1520 may be configured to receive or transmit messages or other signaling as described herein via the transceiver 1515. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of early NACK indication for a data message as described herein, or the processor 1540 and the memory 1530 may be otherwise configured to perform or support such operations.

Figure 16:
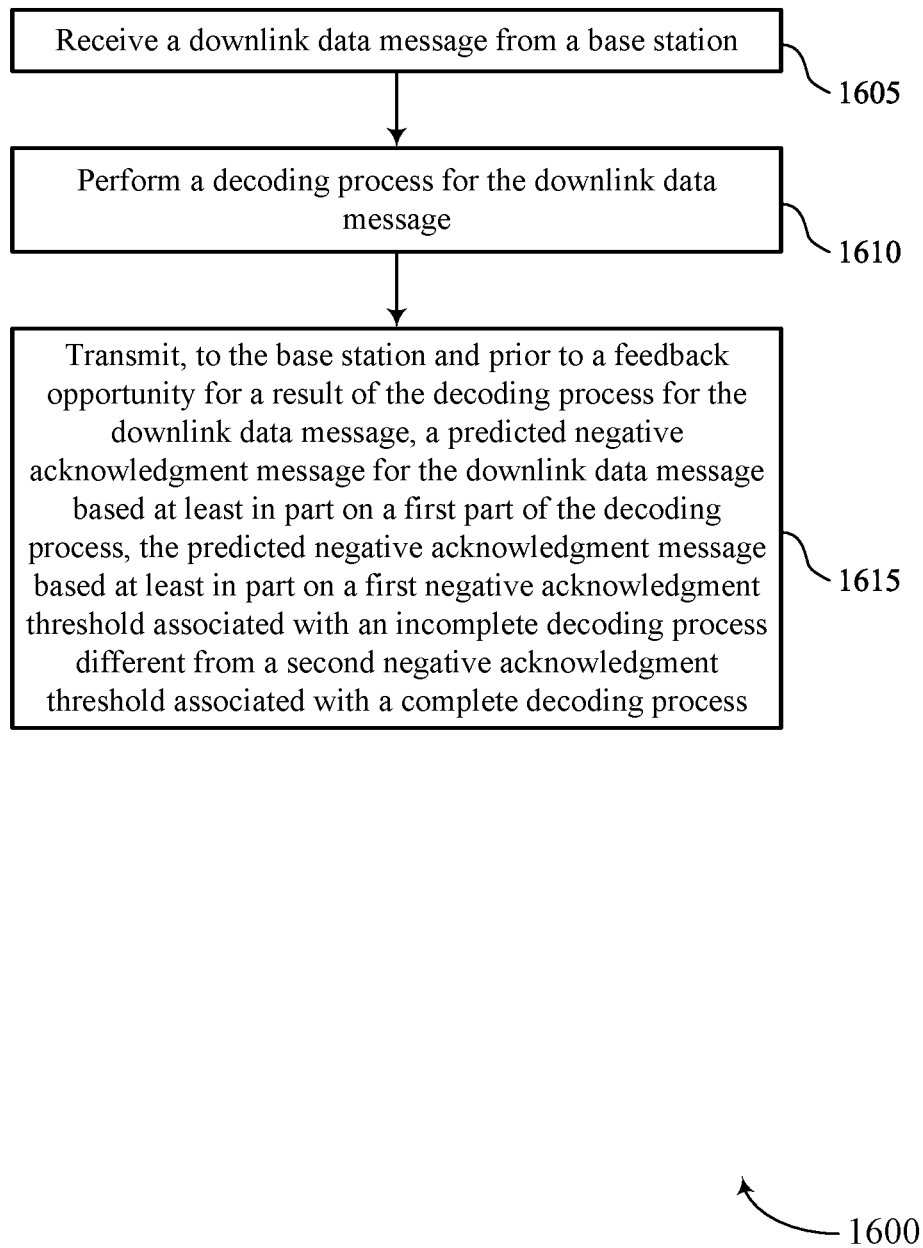
FIGS. 16 through 19 show flowcharts illustrating methods that support early NACK indication for a data message in accordance with aspects of the present disclosure.

FIG. 16 shows a flowchart illustrating a method 1600 that supports early NACK indication for a data message in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving a downlink data message from a base station. The operations of 1605 may be performed in accordance with examples as disclosed herein. In some examples, aspects of the operations of 1605 may be performed by a data reception component 1025 as described with reference to FIG. 10. Additionally or alternatively, means for performing 1605 may, but not necessarily, include, for example, antenna 1125, transceiver 1115, communications manager 1120, memory 1130 (including code 1135), processor 1140 and/or bus 1145.

At 1610, the method may include performing a decoding process for the downlink data message. The operations of 1610 may be performed in accordance with examples as disclosed herein. In some examples, aspects of the operations of 1610 may be performed by a decoding component 1030 as described with reference to FIG. 10. Additionally or alternatively, means for performing 1610 may, but not necessarily, include, for example, antenna 1125, transceiver 1115, communications manager 1120, memory 1130 (including code 1135), processor 1140 and/or bus 1145.

At 1615, the method may include transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process. The operations of 1615 may be performed in accordance with examples as disclosed herein. In some examples, aspects of the operations of 1615 may be performed by a predicted NACK component 1035 as described with reference to FIG. 10. Additionally or alternatively, means for performing 1615 may, but not necessarily, include, for example, antenna 1125, transceiver 1115, communications manager 1120, memory 1130 (including code 1135), processor 1140 and/or bus 1145.

Figure 17:
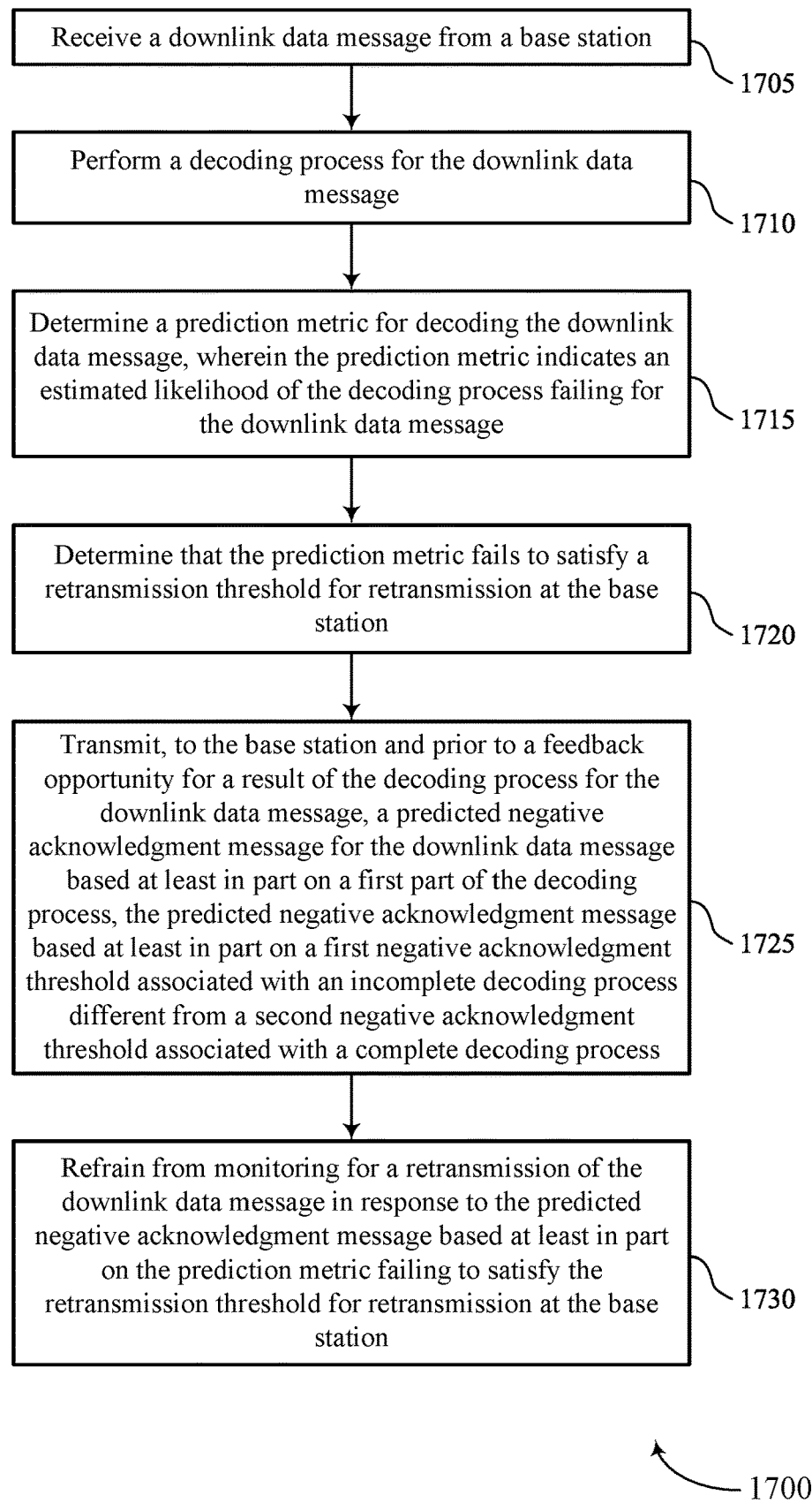

FIG. 17 shows a flowchart illustrating a method 1700 that supports early NACK indication for a data message in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving a downlink data message from a base station. The operations of 1705 may be performed in accordance with examples as disclosed herein. In some examples, aspects of the operations of 1705 may be performed by a data reception component 1025 as described with reference to FIG. 10. Additionally or alternatively, means for performing 1705 may, but not necessarily, include, for example, antenna 1125, transceiver 1115, communications manager 1120, memory 1130 (including code 1135), processor 1140 and/or bus 1145.

At 1710, the method may include performing a decoding process for the downlink data message. The operations of 1710 may be performed in accordance with examples as disclosed herein. In some examples, aspects of the operations of 1710 may be performed by a decoding component 1030 as described with reference to FIG. 10. Additionally or alternatively, means for performing 1710 may, but not necessarily, include, for example, antenna 1125, transceiver 1115, communications manager 1120, memory 1130 (including code 1135), processor 1140 and/or bus 1145.

At 1715, the method may include determining a prediction metric for decoding the downlink data message, where the prediction metric indicates an estimated likelihood of the decoding process failing for the downlink data message. The operations of 1715 may be performed in accordance with examples as disclosed herein. In some examples, aspects of the operations of 1715 may be performed by a decoding component 1030 as described with reference to FIG. 10. Additionally or alternatively, means for performing 1715 may, but not necessarily, include, for example, antenna 1125, transceiver 1115, communications manager 1120, memory 1130 (including code 1135), processor 1140 and/or bus 1145.

At 1720, the method may include determining that the prediction metric fails to satisfy a retransmission threshold for retransmission at the base station. The operations of 1720 may be performed in accordance with examples as disclosed herein. In some examples, aspects of the operations of 1720 may be performed by a decoding component 1030 as described with reference to FIG. 10. Additionally or alternatively, means for performing 1720 may, but not necessarily, include, for example, antenna 1125, transceiver 1115, communications manager 1120, memory 1130 (including code 1135), processor 1140 and/or bus 1145.

At 1725, the method may include transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process. The operations of 1725 may be performed in accordance with examples as disclosed herein. In some examples, aspects of the operations of 1725 may be performed by a predicted NACK component 1035 as described with reference to FIG. 10. Additionally or alternatively, means for performing 1725 may, but not necessarily, include, for example, antenna 1125, transceiver 1115, communications manager 1120, memory 1130 (including code 1135), processor 1140 and/or bus 1145.

At 1730, the method may include refraining from monitoring for a retransmission of the downlink data message in response to the predicted NACK message based on the prediction metric failing to satisfy the retransmission threshold for retransmission at the base station. The operations of 1730 may be performed in accordance with examples as disclosed herein. In some examples, aspects of the operations of 1730 may be performed by a data reception component 1025 as described with reference to FIG. 10. Additionally or alternatively, means for performing 1730 may, but not necessarily, include, for example, antenna 1125, transceiver 1115, communications manager 1120, memory 1130 (including code 1135), processor 1140 and/or bus 1145.

Figure 18:
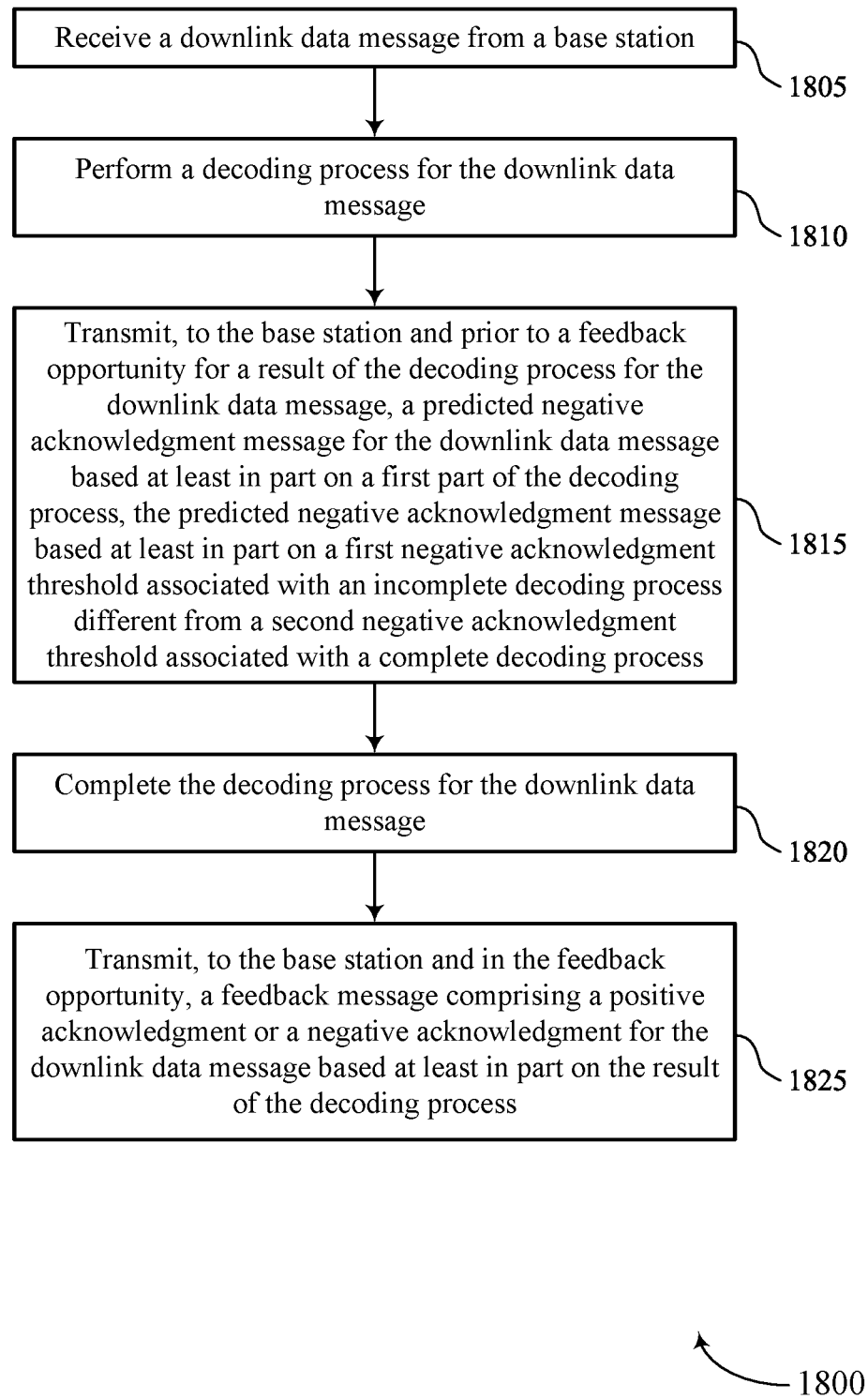

FIG. 18 shows a flowchart illustrating a method 1800 that supports early NACK indication for a data message in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving a downlink data message from a base station. The operations of 1805 may be performed in accordance with examples as disclosed herein. In some examples, aspects of the operations of 1805 may be performed by a data reception component 1025 as described with reference to FIG. 10. Additionally or alternatively, means for performing 1805 may, but not necessarily, include, for example, antenna 1125, transceiver 1115, communications manager 1120, memory 1130 (including code 1135), processor 1140 and/or bus 1145.

At 1810, the method may include performing a decoding process for the downlink data message. The operations of 1810 may be performed in accordance with examples as disclosed herein. In some examples, aspects of the operations of 1810 may be performed by a decoding component 1030 as described with reference to FIG. 10. Additionally or alternatively, means for performing 1810 may, but not necessarily, include, for example, antenna 1125, transceiver 1115, communications manager 1120, memory 1130 (including code 1135), processor 1140 and/or bus 1145.

At 1815, the method may include transmitting, to the base station and prior to a feedback opportunity for a result of the decoding process for the downlink data message, a predicted NACK message for the downlink data message based on a first part of the decoding process, the predicted NACK message based on a first NACK threshold associated with an incomplete decoding process different from a second NACK threshold associated with a complete decoding process. The operations of 1815 may be performed in accordance with examples as disclosed herein. In some examples, aspects of the operations of 1815 may be performed by a predicted NACK component 1035 as described with reference to FIG. 10. Additionally or alternatively, means for performing 1815 may, but not necessarily, include, for example, antenna 1125, transceiver 1115, communications manager 1120, memory 1130 (including code 1135), processor 1140 and/or bus 1145.

At 1820, the method may include completing the decoding process for the downlink data message. The operations of 1820 may be performed in accordance with examples as disclosed herein. In some examples, aspects of the operations of 1820 may be performed by a decoding component 1030 as described with reference to FIG. 10. Additionally or alternatively, means for performing 1820 may, but not necessarily, include, for example, antenna 1125, transceiver 1115, communications manager 1120, memory 1130 (including code 1135), processor 1140 and/or bus 1145.

At 1825, the method may include transmitting, to the base station and in the feedback opportunity, a feedback message including a positive acknowledgment or a NACK for the downlink data message based on the result of the decoding process (e.g., based on the second NACK threshold associated with the complete decoding process). The operations of 1825 may be performed in accordance with examples as disclosed herein. In some examples, aspects of the operations of 1825 may be performed by a feedback component 1050 as described with reference to FIG. 10. Additionally or alternatively, means for performing 1825 may, but not necessarily, include, for example, antenna 1125, transceiver 1115, communications manager 1120, memory 1130 (including code 1135), processor 1140 and/or bus 1145.

Figure 19:
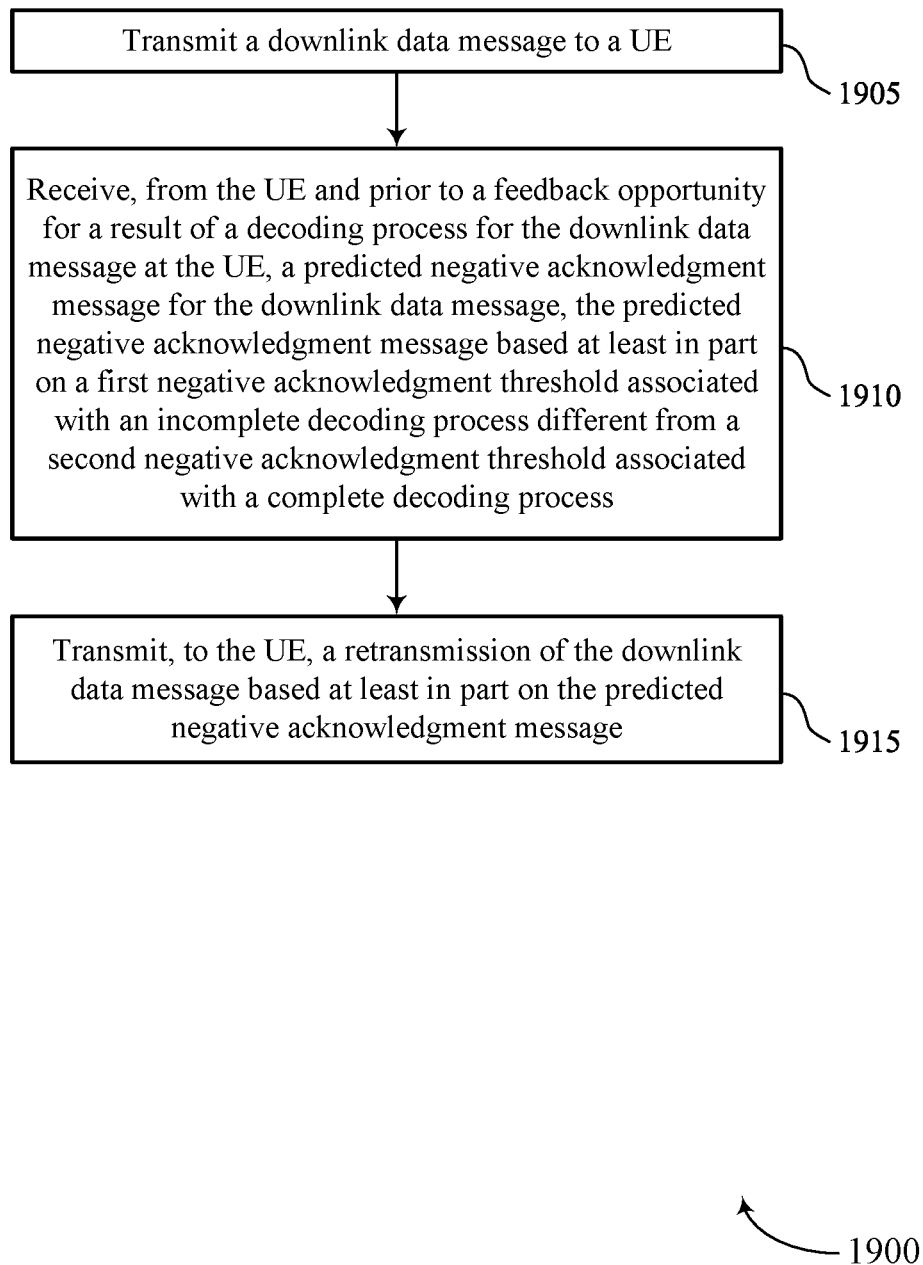

FIG. 19 shows a flowchart illustrating a method 1900 that supports early NACK indication for a data message in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting a downlink data message to a UE. The operations of 1905 may be performed in accordance with examples as disclosed herein. In some examples, aspects of the operations of 1905 may be performed by a data transmission component 1425 as described with reference to FIG. 14. Additionally or alternatively, means for performing 1905 may, but not necessarily, include, for example, antenna 1525, transceiver 1515, communications manager 1520, memory 1530 (including code 1535), processor 1540 and/or bus 1550.

At 1910, the method may include receiving, from the UE and prior to a feedback opportunity for a result of a decoding process for the downlink data message at the UE, a predicted NACK message for the downlink data message, the predicted NACK message based on a first NACK threshold associated with an incomplete decoding process different from a second NACK threshold associated with a complete decoding process. The operations of 1910 may be performed in accordance with examples as disclosed herein. In some examples, aspects of the operations of 1910 may be performed by a predicted NACK component 1430 as described with reference to FIG. 14. Additionally or alternatively, means for performing 1910 may, but not necessarily, include, for example, antenna 1525, transceiver 1515, communications manager 1520, memory 1530 (including code 1535), processor 1540 and/or bus 1550.

At 1915, the method may include transmitting, to the UE, a retransmission of the downlink data message based on the predicted NACK message. The operations of 1915 may be performed in accordance with examples as disclosed herein. In some examples, aspects of the operations of 1915 may be performed by a data transmission component 1425 as described with reference to FIG. 14. Additionally or alternatively, means for performing 1915 may, but not necessarily, include, for example, antenna 1525, transceiver 1515, communications manager 1520, memory 1530 (including code 1535), processor 1540 and/or bus 1550.

The following provides an overview of aspects of the present disclosure:

Aspect 1: A method for wireless communications at a UE, comprising: receiving a downlink data message from a base station; performing a decoding process for the downlink data message; and transmitting, to the base station and prior to a feedback opportunity for a result of the decoding process for the downlink data message, a predicted NACK message for the downlink data message based at least in part on a first part of the decoding process, the predicted NACK message based at least in part on a first NACK threshold associated with an incomplete decoding process different from a second NACK threshold associated with a complete decoding process.

Aspect 2: The method of aspect 1, wherein receiving the downlink data message comprises receiving the downlink data message from a first TRP of the base station; and transmitting the predicted NACK message comprises transmitting the predicted NACK message to a second TRP of the base station.

Aspect 3: The method of aspect 2, wherein the downlink data message is received from the first TRP according to a first beam configuration; and the predicted NACK message is transmitted to the second TRP according to a second beam configuration.

Aspect 4: The method of any of aspects 1 through 3, further comprising: receiving, from the base station, a retransmission of the downlink data message based at least in part on the predicted NACK message.

Aspect 5: The method of any of aspects 1 through 3, further comprising: determining a prediction metric for decoding the downlink data message, wherein the prediction metric indicates an estimated likelihood of the decoding process failing for the downlink data message; determining that the prediction metric fails to satisfy a retransmission threshold for retransmission at the base station; and refraining from monitoring for a retransmission of the downlink data message in response to the predicted NACK message based at least in part on the prediction metric failing to satisfy the retransmission threshold for retransmission at the base station.

Aspect 6: The method of any of aspects 1 through 5, further comprising: transmitting, to the base station, a UE capability message indicating support for transmitting the predicted NACK message, a processing timeline value for the UE to transmit the predicted NACK message, or a combination thereof, wherein the predicted NACK message is transmitted based at least in part on the UE capability message.

Aspect 7: The method of any of aspects 1 through 6, further comprising: receiving, from the base station, a configuration message indicating a timing for transmitting the predicted NACK message, one or more retransmission thresholds for retransmission at one or more TRPs of the base station based at least in part on a prediction metric of the predicted NACK message, or a combination thereof, wherein the predicted NACK message is transmitted based at least in part on the configuration message.

Aspect 8: The method of any of aspects 1 through 7, further comprising: generating the predicted NACK message, wherein the generating is initiated prior to completion of the decoding process for the downlink data message and the predicted NACK message comprises an indication of a cause for the decoding process for the downlink data message to be predicted to fail, a prediction metric indicating an estimated likelihood of the decoding process failing for the downlink data message, or a combination thereof, and wherein the predicted NACK message is transmitted based at least in part on the generating.

Aspect 9: The method of any of aspects 1 through 8, further comprising: determining that the decoding process for the downlink data message is predicted to fail based at least in part on one or more SNR values, one or more SINR values, one or more RSRP values, one or more reference signal received quality values, or a combination thereof for one or more DMRSs received with the downlink data message, one or more LLRs for a first set of decoding stages of a plurality of decoding stages for the decoding process, one or more path metrics for the first set of decoding stages of the plurality of decoding stages for the decoding process, or a combination thereof, wherein the predicted NACK message is transmitted based at least in part on the decoding process for the downlink data message being predicted to fail.

Aspect 10: The method of any of aspects 1 through 7, further comprising: completing the decoding process for the downlink data message; and transmitting, to the base station and in the feedback opportunity, a feedback message comprising a positive ACK or a NACK for the downlink data message based at least in part on the result of the decoding process.

Aspect 11: The method of aspect 10, further comprising: determining a first uplink resource for transmitting the predicted NACK message based at least in part on a first processing timeline value and a starting symbol for receiving the downlink data message; and determining the feedback opportunity for transmitting the feedback message subsequent to the first uplink resource based at least in part on a second processing timeline value and an ending symbol for receiving the downlink data message.

Aspect 12: The method of aspect 11, further comprising: operating in a half-duplex mode, wherein the first uplink resource comprises a dedicated uplink resource for transmitting the predicted NACK message time-division duplexed with a plurality of downlink resources in a time period.

Aspect 13: The method of any of aspects 1 through 12, wherein the downlink data message is received in a time period; and the predicted NACK message is transmitted in the time period prior to an end of the time period.

Aspect 14: The method of any of aspects 1 through 12, wherein the downlink data message is received in a first time period of a plurality of contiguous time periods allocated for downlink signaling; and the predicted NACK message is transmitted in a second time period of the plurality of contiguous time periods prior to at least a portion of the plurality of contiguous time periods.

Aspect 15: A method for wireless communications at a base station, comprising: transmitting a downlink data message to a UE; receiving, from the UE and prior to a feedback opportunity for a result of a decoding process for the downlink data message at the UE, a predicted NACK message for the downlink data message, the predicted NACK message based at least in part on a first NACK threshold associated with an incomplete decoding process different from a second NACK threshold associated with a complete decoding process; and transmitting, to the UE, a retransmission of the downlink data message based at least in part on the predicted NACK message.

Aspect 16: The method of aspect 15, wherein transmitting the downlink data message comprises transmitting the downlink data message via a first TRP of the base station; and receiving the predicted NACK message comprises receiving the predicted NACK message via a second TRP of the base station.

Aspect 17: The method of aspect 16, wherein the downlink data message is transmitted via the first TRP according to a first beam configuration; and the predicted NACK message is received via the second TRP according to a second beam configuration.

Aspect 18: The method of any of aspects 15 through 17, further comprising: determining that a prediction metric indicated by the predicted NACK message satisfies a retransmission threshold, wherein the prediction metric indicates an estimated likelihood of the decoding process for the downlink data message failing at the UE, and wherein transmitting the retransmission of the downlink data message is further based at least in part on determining that the prediction metric satisfies the retransmission threshold.

Aspect 19: The method of aspect 18, further comprising: transmitting, to an additional UE, an additional downlink data message; receiving, from the additional UE and prior to an additional feedback opportunity for a result of an additional decoding process for the additional downlink data message at the additional UE, an additional predicted NACK message for the additional downlink data message; determining that an additional prediction metric indicated by the additional predicted NACK message fails to satisfy the retransmission threshold; and refraining from transmitting a retransmission of the additional downlink data message in response to the additional predicted NACK message based at least in part on the additional prediction metric failing to satisfy the retransmission threshold.

Aspect 20: The method of any of aspects 15 through 19, further comprising: receiving, from the UE, a UE capability message indicating support for transmitting the predicted NACK message, a processing timeline value for the UE to transmit the predicted NACK message, or a combination thereof, and monitoring for the predicted NACK message based at least in part on the UE capability message, wherein the predicted NACK message is received based at least in part on the monitoring.

Aspect 21: The method of any of aspects 15 through 20, further comprising: transmitting, to the UE, a configuration message indicating a timing for the UE to transmit the predicted NACK message, one or more retransmission thresholds for retransmission at one or more TRPs of the base station based at least in part on a prediction metric of the predicted NACK message, or a combination thereof, wherein the predicted NACK message is received based at least in part on the configuration message.

Aspect 22: The method of any of aspects 15 through 21, wherein the predicted NACK message comprises an indication of a cause for the decoding process for the downlink data message at the UE to be predicted to fail, a prediction metric indicating an estimated likelihood of the decoding process for the downlink data message to fail, or a combination thereof.

Aspect 23: The method of any of aspects 15 through 22, wherein the downlink data message is transmitted in a time period; and the predicted NACK message is received in the time period prior to an end of the time period.

Aspect 24: The method of any of aspects 15 through 22, wherein the downlink data message is transmitted in a first time period of a plurality of contiguous time periods allocated for downlink signaling; and the predicted NACK message is received in a second time period of the plurality of contiguous time periods prior to at least a portion of the plurality of contiguous time periods.

Aspect 25: An apparatus for wireless communications, comprising: a processor of a UE; a transceiver coupled with the processor; and memory coupled with the processor, the memory and the processor configured to cause the apparatus to perform a method of any of aspects 1 through 14.

Aspect 26: An apparatus for wireless communications at a UE, comprising at least one means for performing a method of any of aspects 1 through 14.

Aspect 27: A non-transitory computer-readable medium storing code for wireless communications at a UE, the code comprising instructions executable by a processor to perform a method of any of aspects 1 through 14.

Aspect 28: An apparatus for wireless communications, comprising: a processor of a base station; a transceiver coupled with the processor; and memory coupled with the processor, the memory and the processor configured to cause the apparatus to perform a method of any of aspects 15 through 24.

Aspect 29: An apparatus for wireless communications at a base station, comprising at least one means for performing a method of any of aspects 15 through 24.

Aspect 30: A non-transitory computer-readable medium storing code for wireless communications at a base station, the code comprising instructions executable by a processor to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving a downlink data message from a first transmission reception point of a base station;

performing a decoding process for the downlink data message; and transmitting, to a second transmission reception point of the base station and prior to a feedback opportunity for a result of the decoding process for the downlink data message, a predicted negative acknowledgment message for the downlink data message based at least in part on a first part of the decoding process, the predicted negative acknowledgment message based at least in part on a first negative acknowledgment threshold associated with an incomplete decoding process different from a second negative acknowledgment threshold associated with a complete decoding process.

2. The method of claim 1, wherein:
the downlink data message is received from the first transmission reception point according to a first beam configuration; and
the predicted negative acknowledgment message is transmitted to the second transmission reception point according to a second beam configuration.

3. The method of claim 1, further comprising:
receiving, from the base station, a retransmission of the downlink data message based at least in part on the predicted negative acknowledgment message.

4. The method of claim 1, further comprising:
determining a prediction metric for decoding the downlink data message, wherein the prediction metric indicates an estimated likelihood of the decoding process failing for the downlink data message;
determining that the prediction metric fails to satisfy a retransmission threshold for retransmission at the base station; and
refraining from monitoring for a retransmission of the downlink data message in response to the predicted negative acknowledgment message based at least in part on the prediction metric failing to satisfy the retransmission threshold for retransmission at the base station.

5. The method of claim 1, further comprising:
transmitting, to the base station, a UE capability message indicating support for transmitting the predicted negative acknowledgment message, a processing timeline value for the UE to transmit the predicted negative acknowledgment message, or a combination thereof, wherein the predicted negative acknowledgment message is transmitted based at least in part on the UE capability message.

6. The method of claim 1, further comprising:
receiving, from the base station, a configuration message indicating a timing for transmitting the predicted negative acknowledgment message, one or more retransmission thresholds for retransmission at one or more transmission reception points of the base station based at least in part on a prediction metric of the predicted negative acknowledgment message, or a combination thereof, wherein the predicted negative acknowledgment message is transmitted based at least in part on the configuration message.

7. The method of claim 1, further comprising:
generating the predicted negative acknowledgment message, wherein the generating is initiated prior to completion of the decoding process for the downlink data message and the predicted negative acknowledgment message comprises an indication of a cause for the decoding process for the downlink data message to be predicted to fail, a prediction metric indicating an estimated likelihood of the decoding process failing for the downlink data message, or a combination thereof, and wherein the predicted negative acknowledgment message is transmitted based at least in part on the generating.

8. The method of claim 1, further comprising:
determining that the decoding process for the downlink data message is predicted to fail based at least in part on one or more signal-to-noise ratio values, one or more signal-to-interference-plus-noise ratio values, one or more reference signal received power values, one or more reference signal received quality values, or a combination thereof for one or more demodulation reference signals received with the downlink data message, one or more log-likelihood ratios for a first set of decoding stages of a plurality of decoding stages for the decoding process, one or more path metrics for the first set of decoding stages of the plurality of decoding stages for the decoding process, or a combination thereof, wherein the predicted negative acknowledgment message is transmitted based at least in part on the decoding process for the downlink data message being predicted to fail.

9. The method of claim 1, further comprising:
completing the decoding process for the downlink data message; and
transmitting, to the base station and in the feedback opportunity, a feedback message comprising a positive acknowledgment or a negative acknowledgment for the downlink data message based at least in part on the result of the decoding process.

10. The method of claim 9, further comprising:
determining a first uplink resource for transmitting the predicted negative acknowledgment message based at least in part on a first processing timeline value and a starting symbol for receiving the downlink data message; and
determining the feedback opportunity for transmitting the feedback message subsequent to the first uplink resource based at least in part on a second processing timeline value and an ending symbol for receiving the downlink data message.

11. The method of claim 10, further comprising:
operating in a half-duplex mode, wherein the first uplink resource comprises a dedicated uplink resource for transmitting the predicted negative acknowledgment message time-division duplexed with a plurality of downlink resources in a time period.

12. The method of claim 1, wherein:
the downlink data message is received in a time period; and
the predicted negative acknowledgment message is transmitted in the time period prior to an end of the time period.

13. The method of claim 1, wherein:
the downlink data message is received in a first time period of a plurality of contiguous time periods allocated for downlink signaling; and
the predicted negative acknowledgment message is transmitted in a second time period of the plurality of contiguous time periods prior to at least a portion of the plurality of contiguous time periods.

14. A method for wireless communications at a base station, comprising:
transmitting, via a first transmission reception point of the base station, a downlink data message to a user equipment (UE);
receiving, via a second transmission reception point of the base station from the UE and prior to a feedback opportunity for a result of a decoding process for the downlink data message at the UE, a predicted negative acknowledgment message for the downlink data message, the predicted negative acknowledgment message based at least in part on a first negative acknowledgment threshold associated with an incomplete decoding process different from a second negative acknowledgment threshold associated with a complete decoding process; and transmitting, to the UE, a retransmission of the downlink data message based at least in part on the predicted negative acknowledgment message.

15. The method of claim 14, wherein:

the downlink data message is transmitted via the first transmission reception point according to a first beam configuration; and the predicted negative acknowledgment message is received via the second transmission reception point according to a second beam configuration.

16. The method of claim 14, further comprising:

determining that a prediction metric indicated by the predicted negative acknowledgment message satisfies a retransmission threshold, wherein the prediction metric indicates an estimated likelihood of the decoding process for the downlink data message failing at the UE, and wherein transmitting the retransmission of the downlink data message is further based at least in part on determining that the prediction metric satisfies the retransmission threshold.

17. The method of claim 16, further comprising:

transmitting, to an additional UE, an additional downlink data message;

receiving, from the additional UE and prior to an additional feedback opportunity for a result of an additional decoding process for the additional downlink data message at the additional UE, an additional predicted negative acknowledgment message for the additional downlink data message;

determining that an additional prediction metric indicated by the additional predicted negative acknowledgment message fails to satisfy the retransmission threshold; and refraining from transmitting a retransmission of the additional downlink data message in response to the additional predicted negative acknowledgment message based at least in part on the additional prediction metric failing to satisfy the retransmission threshold.

18. The method of claim 14, further comprising:

receiving, from the UE, a UE capability message indicating support for transmitting the predicted negative acknowledgment message, a processing timeline value for the UE to transmit the predicted negative acknowledgment message, or a combination thereof; and monitoring for the predicted negative acknowledgment message based at least in part on the UE capability message, wherein the predicted negative acknowledgment message is received based at least in part on the monitoring.

19. The method of claim 14, further comprising:

transmitting, to the UE, a configuration message indicating a timing for the UE to transmit the predicted negative acknowledgment message, one or more retransmission thresholds for retransmission at one or more transmission reception points of the base station based at least in part on a prediction metric of the predicted negative acknowledgment message, or a combination thereof, wherein the predicted negative acknowledgment message is received based at least in part on the configuration message.

20. The method of claim 14, wherein the predicted negative acknowledgment message comprises an indication of a cause for the decoding process for the downlink data message at the UE to be predicted to fail, a prediction metric indicating an estimated likelihood of the decoding process for the downlink data message to fail, or a combination thereof.

21. The method of claim 14, wherein:

the downlink data message is transmitted in a time period; and the predicted negative acknowledgment message is received in the time period prior to an end of the time period.

22. The method of claim 14, wherein:

the downlink data message is transmitted in a first time period of a plurality of contiguous time periods allocated for downlink signaling; and the predicted negative acknowledgment message is received in a second time period of the plurality of contiguous time periods prior to at least a portion of the plurality of contiguous time periods.

23. An apparatus for wireless communications comprising:

a processor of a user equipment (UE);

a transceiver coupled with the processor; and memory coupled with the processor, the memory and the processor configured to cause the apparatus to:

receive, via the transceiver, a downlink data message from a first transmission reception point of a base station;

perform a decoding process for the downlink data message; and transmit, via the transceiver, to a second transmission reception point of the base station and prior to a feedback opportunity for a result of the decoding process for the downlink data message, a predicted negative acknowledgment message for the downlink data message based at least in part on a first part of the decoding process, the predicted negative acknowledgment message based at least in part on a first negative acknowledgment threshold associated with an incomplete decoding process different from a second negative acknowledgment threshold associated with a complete decoding process.

24. The apparatus of claim 23, wherein:

the downlink data message is received from the first transmission reception point according to a first beam configuration; and the predicted negative acknowledgment message is transmitted to the second transmission reception point according to a second beam configuration.

25. An apparatus for wireless communications comprising:

a processor of a base station; and memory coupled with the processor, the memory and the processor configured to cause the apparatus to:

transmit, via a first transmission reception point of the base station, a downlink data message to a user equipment (UE);

receive, via a second transmission reception point of the base station, from the UE, and prior to a feedback opportunity for a result of a decoding process for the downlink data message at the UE, a predicted negative acknowledgment message for the downlink data message, the predicted negative acknowledgment message based at least in part on a first negative acknowledgment threshold associated with an incomplete decoding process different from a second negative acknowledgment threshold associated with a complete decoding process; and transmit, via the transceiver and to the UE, a retransmission of the downlink data message based at least in part on the predicted negative acknowledgment message.

26. The apparatus of claim 25, wherein:

the downlink data message is transmitted via the first transmission reception point according to a first beam configuration; and the predicted negative acknowledgment message is received via the second transmission reception point according to a second beam configuration.

* * * * *